(12) United States Patent
Kobayashi et al.

(10) Patent No.: US 9,054,630 B2
(45) Date of Patent: Jun. 9, 2015

(54) SYNCHRONOUS MACHINE CONTROLLER

(71) Applicant: Mitsubishi Electric Corporation, Chiyoda-ku, Tokyo (JP)

(72) Inventors: Takahiko Kobayashi, Tokyo (JP); Kiyoharu Anzai, Tokyo (JP); Noriyuki Wada, Tokyo (JP); Daiki Matsuura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1 day.

(21) Appl. No.: 14/163,246

(22) Filed: Jan. 24, 2014

(65) Prior Publication Data

US 2014/0333240 A1   Nov. 13, 2014

(30) Foreign Application Priority Data

May 13, 2013   (JP) ................................ 2013-100882

(51) Int. Cl.
*H02P 21/14* (2006.01)
*H02P 6/16* (2006.01)
*H02P 21/00* (2006.01)

(52) U.S. Cl.
CPC .................................... *H02P 21/141* (2013.01)

(58) Field of Classification Search
CPC ..... H02P 6/18; H02P 21/141; H02P 29/0066; H02P 6/085; H02P 21/0035; H02P 21/14; H02P 21/145; H02P 21/148; H02P 21/04; H02P 21/146; H02P 23/14; H02P 29/0044; H02P 29/02; H02P 6/08; H02P 6/14; H02P 6/183; H02P 9/009; H02P 9/30; H02P 21/00; H02P 21/0003; H02P 21/0039; H02P 21/06; H02P 21/13; H02P 2207/05; H02P 29/022

USPC .......... 318/400.02, 400.33, 400.36, 471, 472, 318/716, 807; 701/22
See application file for complete search history.

(56) References Cited

U.S. PATENT DOCUMENTS 5,854,547 A * 12/1998 Nakazawa ..................... 318/716
7,045,988 B2 * 5/2006 Ha et al. ........................ 318/807

(Continued)

FOREIGN PATENT DOCUMENTS

JP   2005-51892 A    2/2005
JP   2005-192325 A   7/2005

(Continued)

OTHER PUBLICATIONS

Japanese Office Action issued Jun. 24, 2014; Patent Application No. 2013-100882.

*Primary Examiner* — Paul Ip
(74) *Attorney, Agent, or Firm* — Sughrue Mion, PLLC; Richard C. Turner

(57) ABSTRACT

A synchronous machine controller includes a position detecting unit that detects a position of a rotor, a current detecting unit that detects an armature current, a current command generating unit that generates first and second current commands, a voltage command generating unit that generates a voltage command on the basis of the current commands, the position of the rotor, and the armature current, a power converting unit that outputs a voltage to the synchronous machine on the basis of the voltage command, a magnetic flux estimating unit that estimates an armature interlinkage flux on the basis of a rotational velocity calculated from a variation of the position of the rotor, the voltage command, and the armature current, and a magnet state estimating unit that estimates a magnetic flux or a temperature of the permanent magnet from the position of the rotor, the armature current, and the armature interlinkage flux.

9 Claims, 14 Drawing Sheets

(56) References Cited

U.S. PATENT DOCUMENTS

| | | | |
|---|---|---|---|
| 7,979,171 B2* | 7/2011 | Wu et al. | 701/22 |
| 8,829,831 B2* | 9/2014 | Yoo | 318/400.02 |
| 8,836,253 B2* | 9/2014 | Kato et al. | 318/400.02 |
| 8,912,739 B2* | 12/2014 | Kobayashi et al. | 318/400.02 |
| 2003/0102839 A1 | 6/2003 | Kinpara et al. | |
| 2005/0024009 A1 | 2/2005 | Kinpara et al. | |
| 2005/0146306 A1* | 7/2005 | Ha et al. | 318/807 |
| 2006/0119312 A1 | 6/2006 | Okamura et al. | |
| 2008/0191656 A1* | 8/2008 | Satake et al. | 318/722 |
| 2010/0109586 A1 | 5/2010 | Matsui et al. | |
| 2011/0050140 A1* | 3/2011 | Sakai et al. | 318/400.36 |
| 2011/0144843 A1* | 6/2011 | Wu et al. | 701/22 |
| 2012/0001573 A1 | 1/2012 | Kimpara et al. | |
| 2012/0194113 A1* | 8/2012 | Lee et al. | 318/400.33 |
| 2013/0088179 A1 | 4/2013 | Kobayashi et al. | |
| 2013/0093370 A1* | 4/2013 | Yoo | 318/400.02 |
| 2013/0113398 A1* | 5/2013 | Kato et al. | 318/400.02 |
| 2013/0249448 A1* | 9/2013 | Kobayashi et al. | 318/400.02 |
| 2014/0375234 A1* | 12/2014 | Kim et al. | 318/400.02 |

FOREIGN PATENT DOCUMENTS

| | | |
|---|---|---|
| JP | 2009-118686 A | 5/2009 |
| JP | 2010-110141 A | 5/2010 |
| JP | 2013-085377 A | 5/2013 |
| WO | 02/091558 A1 | 11/2002 |
| WO | 2010/109528 A1 | 9/2010 |

* cited by examiner

SYNCHRONOUS MACHINE CONTROLLER

BACKGROUND OF THE INVENTION

1. Field of the Invention

The present invention relates to a synchronous machine controller having a power conversion unit for driving a synchronous machine.

2. Background Art

As well known in the art, when a synchronous machine having a permanent magnet as a field magnet is controlled with a synchronous machine controller having a power conversion unit such as an inverter, a phenomenon called "demagnetization" occurs in which the intensity of magnetization, that is, the magnetic flux, of the permanent magnet as a field magnet decreases with a rise in temperature due to current supply of an armature winding of the synchronous machine, iron loss of the synchronous machine itself, or the like. In addition, a phenomenon called "irreversible demagnetization" occurs in which the magnetic flux does not return to the state before the occurrence of magnetization when the temperature once exceeds an allowable temperature and then falls to the normal temperature. Accordingly, when controlling a synchronous machine having a permanent magnet as a field magnet, it is necessary to control at least the temperature of the permanent magnet so as to be lower than the allowable temperature at which irreversible demagnetization occurs. When only the current of the synchronous machine is controlled, the torque generated from the synchronous machine is lowered due to the demagnetization under the same current condition. However, it is difficult to directly mount a temperature sensor on the permanent magnet because of a space problem in a structure of the synchronous machine, protection of surroundings with a case, and the like. Most synchronous machines having a permanent magnet as a field magnet often have the permanent magnet inside a rotor, which makes it more difficult to mount a temperature sensor thereon. Accordingly, in order to control the temperature so as to be lower than the allowable temperature or to confirm a fall in torque due to the demagnetization, there is a demand for techniques of indirectly measuring or estimating the temperature of the permanent magnet or the magnetic flux correlated with the temperature of the permanent magnet using any method.

Therefore, for example, in a rotary electric machine controller disclosed in JP-A-2010-110141, a magnetic flux interlinked with an armature winding from a permanent magnet as a field magnet is acquired on the basis of information on current, temperature, and rotational velocity obtained from sensors such as a current sensor for detecting current flowing between an inverter device and the armature winding of a motor generator, a temperature sensor for detecting the temperature of the armature winding so as to correct a resistance value of the armature winding, and a magnetic pole position sensor for detecting the magnetic pole position of the field magnet.

For example, in a motor driving device disclosed in JP-A-2005-51892, a q axis voltage control value when demagnetization does not occur in a permanent magnet in control using rotational two-axis coordinate (d-q axes) transform is stored in a map and a demagnetization value is calculated on the basis of the q axis voltage control value which is an output of a PI controller when current of a motor is controlled by proportional-integral (PI) control, the q axis voltage control value stored in the map when demagnetization does not occur in the permanent magnet, and a rotational angular velocity ω.

For example, in a demagnetization detecting method of a permanent-magnet electric motor disclosed in JP-A-2005-192325, a step ST1 of measuring a rotational velocity, a current, and a voltage, a step ST3 of estimating the temperature of a winding on the basis of the measured values of the rotational velocity, the current, and the voltage, a step ST4 of estimating the resistance of the winding on the basis of the estimated value of the winding temperature, a step ST5 of estimating the temperature of a rotor magnet portion on the basis of the estimated value of the winding temperature, a step ST6 of estimating a normal value of an induced voltage on the basis of the estimated value of the winding temperature, a step ST7 of estimating an actual value of the induced voltage on the basis of the estimated value of the winding resistance, and a step ST8 of comparing the normal value of the induced voltage coefficient and the actual value, which are estimated in the previous two steps, with each other and determining that demagnetization occurs when the difference therebetween is larger than a predetermined threshold value are sequentially carried out to determine a demagnetization state of the rotor magnet portion.

However, in the rotary electric machine controller disclosed in JP-A-2010-110141, since the resistance value of the armature winding corrected on the basis of the temperature sensor for detecting the temperature of the armature winding is used to acquire the magnetic flux interlinked with the armature winding from the permanent magnet as the field magnet by the use of a flux observer, the temperature sensor for detecting the temperature of the armature winding is necessary and thus there is a problem in that the number of constituent components of the controller increases.

In the motor driving device disclosed in JP-A-2005-51892, it is possible to determine whether demagnetization occurs, but a method of acquiring the absolute value (quantity) of a magnet temperature or a magnet flux is not disclosed and it is necessary to set a d-q axis current command to be equal before and after occurrence of demagnetization so as to determine whether demagnetization occurs. Accordingly, when demagnetization occurs, a decrease in torque due to the demagnetization is corrected by calculating and correcting the demagnetization value after determining that demagnetization occurs, and thus there is a problem in that the torque generated from the motor is lower than a desired torque (command value) until it is determined that demagnetization occurs.

In the demagnetization detecting method of a permanent-magnet electric motor disclosed in JP-A-2005-192325, a ratio of a temperature rise of the armature winding and a temperature rise of the rotor permanent magnet is experimentally calculated in advance and the temperature of the permanent magnet is estimated on the basis of the temperature of the armature winding. However, since a thermal time constant is greatly different between the armature winding and the permanent magnet and other factors such as operating conditions of an electric motor or cooling performance have influence, there is a problem in that it is difficult to unmistakably calculate the temperature rise of the rotor permanent magnet relative to the temperature rise of the armature winding and it is not easy to accurately estimate the magnet temperature on the basis of the temperature of the armature winding under various conditions.

SUMMARY OF THE INVENTION

The present invention is made to solve the above-mentioned problems and an object thereof is to provide a synchronous machine controller which can estimate the temperature or magnetic flux of a permanent magnet with high accuracy without directly mounting a temperature sensor on the permanent magnet forming a field magnet and drive a synchronous machine.

According to an aspect of the invention, there is provided a synchronous machine controller including: a position detecting unit that detects a position of a rotor of a synchronous machine including the rotor in which a field magnet is formed of a permanent magnet or a position estimating unit that estimates the position of the rotor; a current detecting unit that detects an armature current of the synchronous machine; a current command generating unit that generates first and second current commands transformed to an orthogonal two-axis coordinate system on the basis of a torque command; a voltage command generating unit that generates a voltage command on the basis of the first and second current commands, the position of the rotor, and the armature current; a power converting unit that outputs a voltage to the synchronous machine on the basis of the voltage command; a magnetic flux estimating unit that estimates an armature interlinkage flux of the synchronous machine on the basis of a rotational velocity of the synchronous machine calculated from a variation of the position of the rotor, the voltage command, and the armature current; and a magnet state estimating unit that estimates a magnetic flux or a temperature of the permanent magnet from the position of the rotor, the armature current, and the armature interlinkage flux.

According to the synchronous machine controller of the present invention, by estimating the temperature or the magnetic flux of the permanent magnet forming a field magnet from the d-axis current coordinate-transformed from the armature current of the synchronous machine to the orthogonal two-axis coordinate system and the d-axis component of the armature interlinkage flux estimated by the magnetic flux estimating unit, it is possible to accurately estimate the magnetic flux or the temperature of the permanent magnet forming a field magnet without greatly changing a normally-generated torque and while suppressing deterioration of estimation accuracy due to an error between a set value and an actual value of inductance of the synchronous machine.

The foregoing and other objects, features, aspects, and advantages of the present invention will become more apparent from the following detailed description of the present invention when taken in conjunction with the accompanying drawings.

DETAILED DESCRIPTION OF THE INVENTION

Hereinafter, a synchronous machine controller according to an embodiment of the present invention will be described with reference to FIGS. 1 to 14. The synchronous machine in the present invention includes a rotor formed of a permanent magnet as a field magnet.

Embodiment 1

Figure 1:
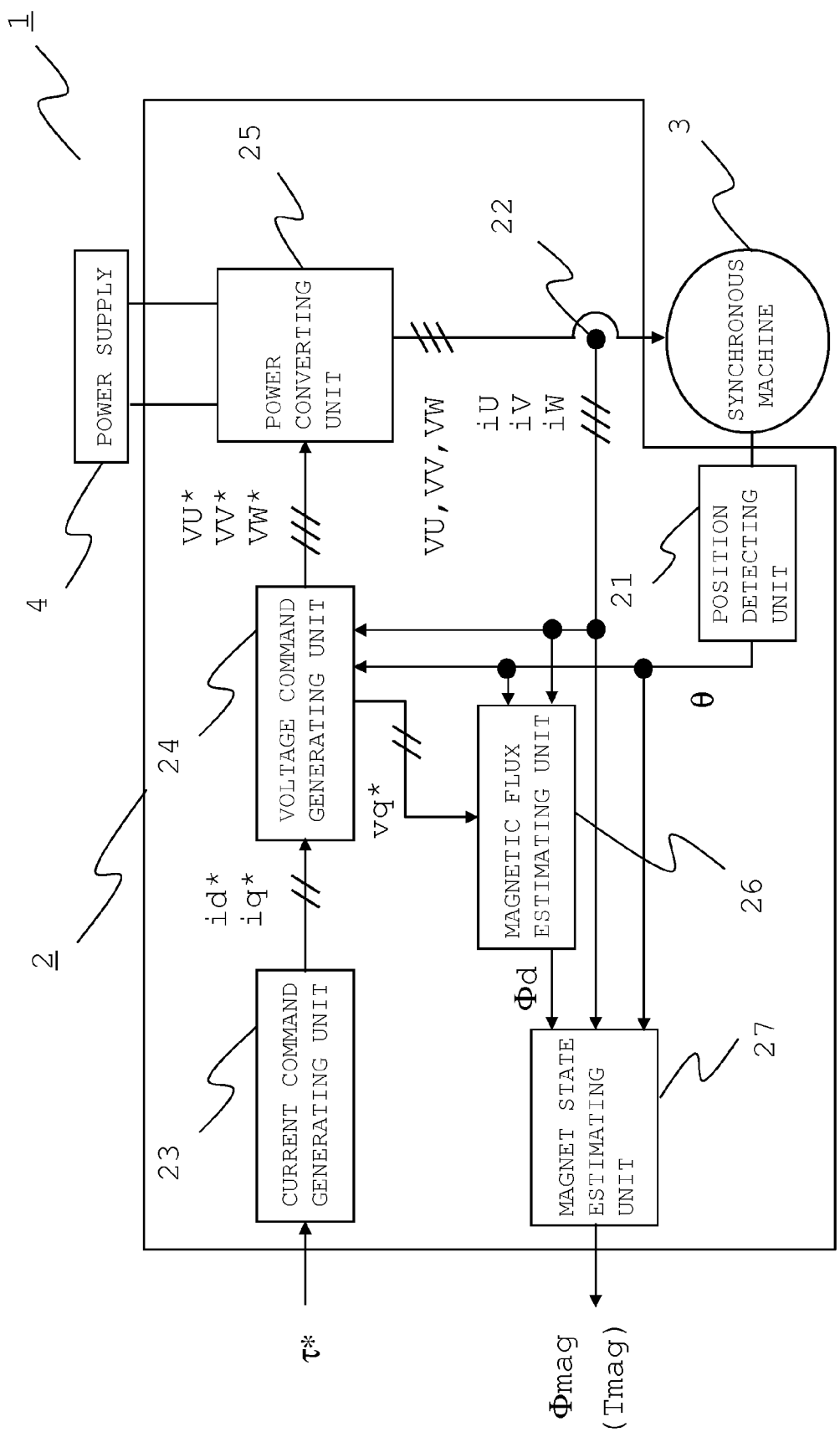
FIG. 1 is a diagram illustrating an entire synchronous machine system including a synchronous machine controller according to Embodiment 1 and a synchronous machine.
Figure 2:
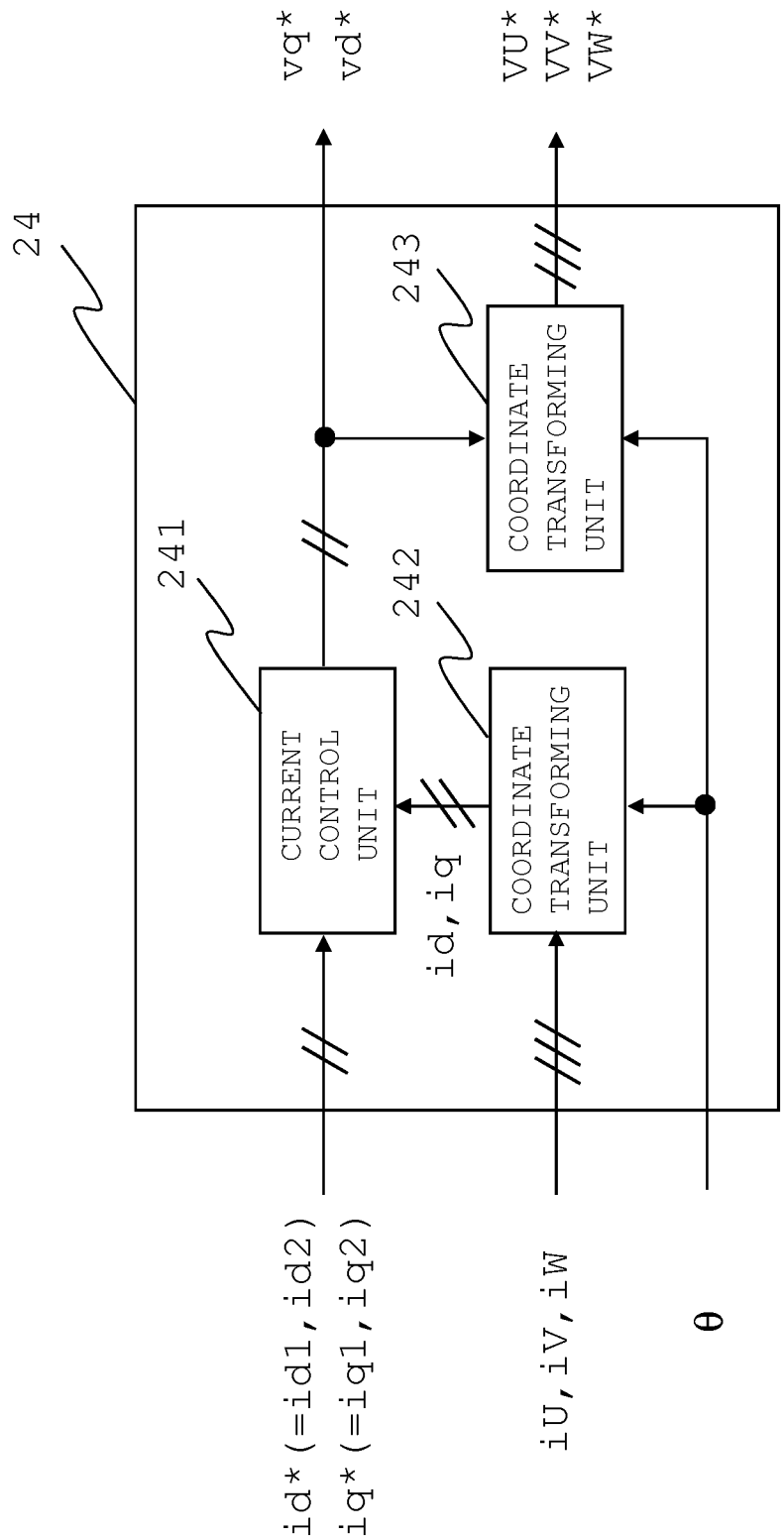
FIG. 2 is a configurational diagram illustrating an example of a voltage command generating unit in the synchronous machine controller according to Embodiment 1.
Figure 3:
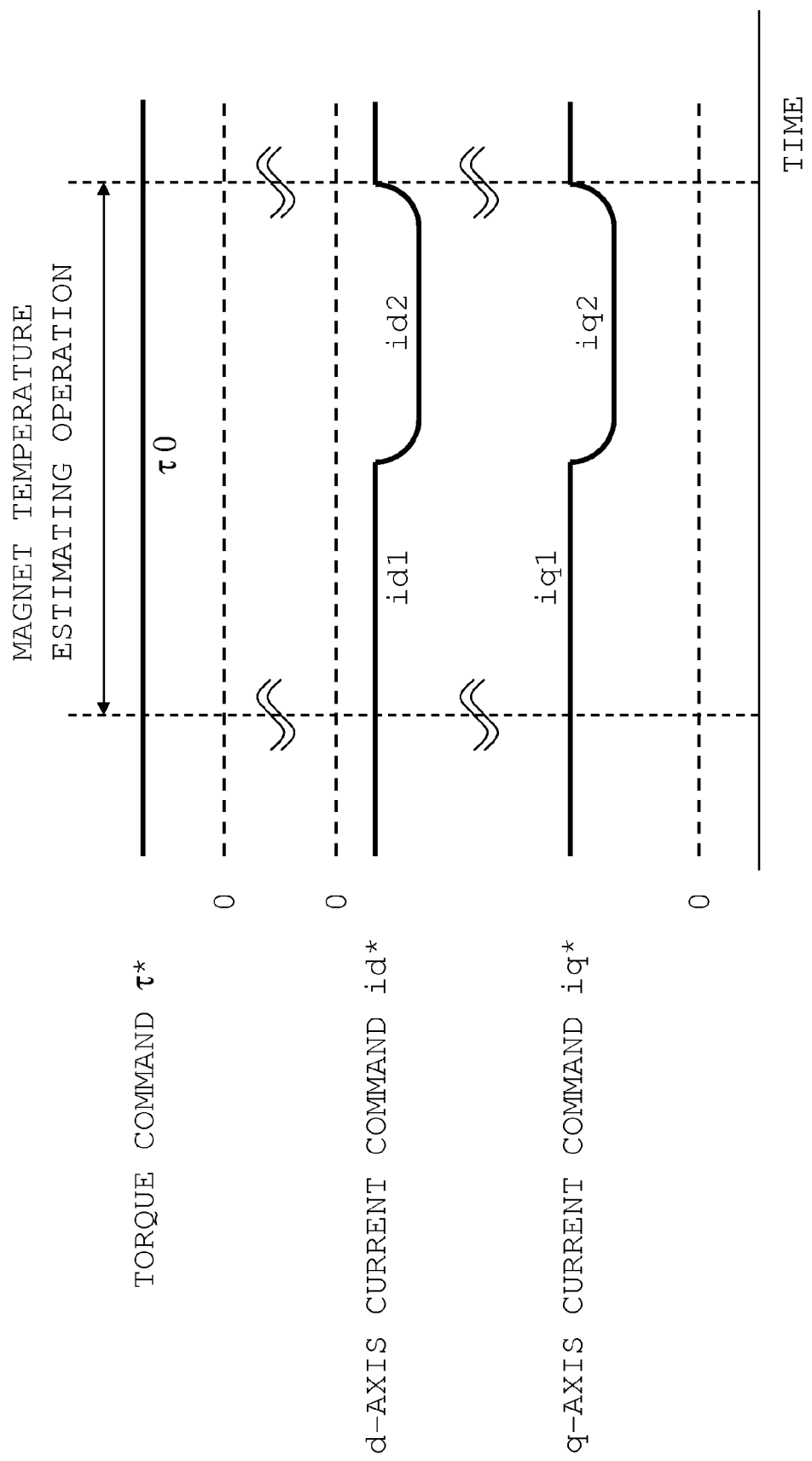
FIG. 3 is a diagram illustrating an example of a timing chart representing a relationship between a torque command and d-q axis current commands id* and iq* in a current command generating unit of the synchronous machine controller according to Embodiment 1.

FIG. 1 is a diagram illustrating an entire synchronous machine system including a synchronous machine controller according to Embodiment 1 and a synchronous machine, FIG. 2 is a configurational diagram illustrating an example of a voltage command generating unit in the synchronous machine controller according to Embodiment 1, and FIG. 3 is a diagram illustrating an example of a timing chart representing a relationship between a torque command and d-q axis current commands id* and iq* in a current command generating unit of the synchronous machine controller according to Embodiment 1.

As illustrated in FIG. 1, a synchronous machine system 1 includes a synchronous machine controller 2, a synchronous machine 3, and a power supply 4.

In the invention, it is assumed that the synchronous machine controller 2 is supplied with a torque command τ* from an upper-level system (not shown in FIG. 1) of the synchronous machine system 1. Examples of the upper-level system include a vehicle control device that determines a torque command τ* depending on various inputs such as an input to an accelerator (notch) or a brake pedal by a driver (operator) or a vehicle speed when the synchronous machine system 1 is used to drive vehicles such as an electric vehicle (EV) or a hybrid vehicle having both an internal engine and a motor and electric vehicles such as a railroad vehicle, and an upper-level system that generates a torque command τ* on the basis of various factors in applications such as factory automation (FA) and elevators.

The magnetic flux Φmag or the temperature Tmag of a permanent magnet estimated by the synchronous machine controller 2 according to the invention may be transmitted to the upper-level system and the estimated value may be used to control the upper-level system. In the invention, the upper-level system giving the torque command τ* is not particularly limited and thus the upper-level system will not be mentioned anymore.

Here, as illustrated in FIGS. 1 and 2, the synchronous machine controller 2 includes a position detecting unit 21 as a position identification unit that detects a position θ of a rotor of the synchronous machine 3 having the rotor in which a field magnet is formed of a permanent magnet, a current detecting unit 22 that detects armature current iu, iv, and iw of the synchronous machine 3, a current command generating unit 23 that generates current commands id* and iq* (a first current command (id1 and iq1) and a second current command (id2 and iq2) in a rotary orthogonal two-axis (hereinafter, referred to as d-q axes) coordinate system on the basis of the torque command τ*, a voltage command generating unit 24 that generates voltage commands vd* and vq* in the orthogonal two-axis coordinate system on the basis of current id and iq obtained by coordinate-transforming the armature current iu, iv, and iw to the orthogonal two-axis coordinate system on the basis of the current commands id* and iq* and the position θ of the rotor and generates multiphase (three-phase) AC voltage commands uv*, vv*, and vw* coordinate-transformed from the voltage commands vd* and vq*, a power converting unit 25 that outputs voltages uv, vv, and vw to the synchronous machine 3 on the basis of the voltage commands uv*, vv*, and vw*, a magnetic flux estimating unit 26 that estimates an armature interlinkage flux Φd of the synchronous machine 3 on the basis of a rotational velocity ω of the synchronous machine 3 calculated from a variation of the position θ of the rotor, the voltage command vq*, and the armature current iu, iv, and iw, and a magnet state estimating unit 27 that estimates the magnetic flux Φmag or the temperature Tmag of the permanent magnet from the position θ of the rotor, the armature current iu, iv, and iw, and the armature interlinkage flux Φd. The power converting unit 25 is supplied with power from the power supply 4. The power supply 4 includes a DC voltage source or a battery. Here, a device for acquiring a DC voltage from a single-phase or three-phase AC source through the use of a known converter is included in the concept of the power supply 4.

Elements and operations of the synchronous machine controller 2 according to Embodiment 1 will be described in detail below.

The position detecting unit 21 is formed of a known resolver or a known encoder, or the like and detects the position θ of the rotor of the synchronous machine 3. Here, the position θ of the rotor of the synchronous machine 3 means an angle in an N-pole direction of the permanent magnet forming a field magnet about an axis based on a u-phase armature winding. In general, a d axis of a rotary orthogonal two-axis (hereinafter, referred to as d-q axes) coordinate system rotating at a rotational velocity (referred to as an electrical angular frequency ω) of the synchronous machine 3 is defined in the N-pole direction of the permanent magnet and a q axis is defined in a direction perpendicular to the d axis and leading the d axis by 90°. These definitions are true of the following description.

A multiphase AC voltage is applied to an armature winding so as to drive the synchronous machine 3. Accordingly, an output current is generated in the armature winding of the synchronous machine 3. The output current generated in the armature winding is hereinafter referred to as an armature current. The current detecting unit 22 detects the armature current generated in the armature winding through the use of a current sensor or the like. When the synchronous machine 3 is a three-phase synchronous rotary electric machine, a configuration for detecting all the armature currents iu, iv, and iw of three phases of the synchronous machine 3 may be employed or a configuration for calculating an armature current iw of one phase (for example, w phase) on the basis of the relationship of iw=−iu−iv using two detected armature currents iu and iv of the other two phases and detecting the armature currents of two phases may be employed. The current detecting unit 22 may employ a known technique of detecting an armature current from a DC link current flowing between the power supply 4 and the power converting unit 25 in addition to the configuration using the current sensor for directly detecting the armature currents of the respective phases of the synchronous machine 3.

The current command generating unit 23 generates d-q axis current commands id* and iq* on the basis of a torque command τ* in Embodiment 1. In the synchronous machine 3 having a rotor in which a field magnet is formed of a permanent magnet, since the relational expression of the torque τ and the d-q axis currents id and iq is expressed by Expression (1), it is known that the number of combinations (id*, iq*) of the d-q axis current commands id* and iq* capable of generating the same torque τ is countless.

$$\tau = Pm\{\Phi m \cdot iq + (Ld - Lq) \cdot id \cdot iq\} \quad (1)$$

Here, Pm represents the number of pole pairs of the synchronous machine 3.

Here, id and iq represent the d-q axis currents and are acquired by coordinate-transforming the armature currents iu, iv, and iw of the synchronous machine 3 on the basis of the position θ of the rotor using Expression (2).

$$\begin{pmatrix} id \\ iq \end{pmatrix} = \begin{pmatrix} \cos\theta & \sin\theta \\ -\sin\theta & \cos\theta \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} iu \\ iv \\ iw \end{pmatrix} \quad (2)$$

Therefore, the current command generating unit 23 in Embodiment 1 generates first current commands id* and iq* (=id1 and id1) which are a group of a first d-axis current command id* (=id1) and a first q-axis current command iq* (=iq1) and second current commands id* and iq* (=id2 and iq2) which are a group of a second d-axis current command id* (=id2) and a second q-axis current command iq* (=iq2) and which is different from the first current command, on the basis of the same torque command τ* (=τ0).

Specifically, when a predetermined torque command τ* is input, the first current commands id* and iq* (=id1 and iq2) and the second current commands id* and iq* (=id2 and iq2) based on the torque command τ* are calculated in advance using the relationship of Expression (1) and the relationship is stored in the current command generating unit 23 using a map or a numerical expression.

Alternatively, the first current commands id* and iq* (=id1 and iq2) and the second current commands id* and iq* (=id2 and iq2) based on the torque command τ* with which the entire conversion efficiency of the synchronous machine 3 or the synchronous machine system 1 may be relatively suitable are calculated in advance on the basis of actual machines and actual measurement, and the relationship therebetween may be stored in the current command generating unit 23 using a map or a numerical expression.

The voltage command generating unit 24 outputs d-q axis voltage commands vd* and vq* so as to match the d-q axis currents id and iq with the current commands id* and iq*, coordinate-transforms the d-q axis voltage commands vd* and vq* into multiphase (three-phase) AC voltage commands vu*, vv*, and vw*, and then outputs the resultant to the power converting unit 25. FIG. 2 is a configuration diagram illustrating an example of the configuration of the voltage command generating unit 24 illustrated in FIG. 1.

The coordinate transforming unit 242 coordinate-transforms the armature currents iu, iv, and iw of the synchronous machine 3 to the d-q axis currents id and iq on the basis of the position θ of the rotor using Expression (2). Here, as described later, the magnetic flux estimating unit 26 also performs a coordinate transforming operation of currents based on Expression (2), and the coordinate transforming unit 242 can be omitted by using the d-q axis currents id and iq acquired from the magnetic flux estimating unit 26.

The current control unit 241 performs known proportional-integral control (PI control), for example, on the differences between the d-q axis current commands id* and iq* and the d-q axis currents id and iq and performs so-called current feedback control such as generating d-q axis voltage commands vd* and vq*. Although not illustrated in FIG. 2, known decoupling compensation of compensating for velocity electromotive force generated with the rotation of the synchronous machine 3 may be performed on the d-q axis voltage commands vd* and vq* in a feed-forward manner so as to remove interference between the d axis and the q axis.

The coordinate transforming unit 243 coordinate-transforms the d-q axis voltage commands vd* and vq* output from the current control unit 241 to the multiphase (three-phase) AC voltage commands vu*, vv*, and vw* on the basis of the position θ of the rotor using Expression (3), and outputs the multiphase (three-phase) AC voltage commands to the power converting unit 25. Here, in Expression (3), in consideration of a control operation delay time until a control operation based on the values of the armature currents iu, iv, and iw detected by the current detecting unit 22 is reflected in the voltages vu, vv, and vw output from the power converting unit 25, the position θ of the rotor may be coordinate-transformed to a phase which is corrected by a phase correction value Δθd based on the control operation delay time.

$$\begin{pmatrix} vu^* \\ vv^* \\ vw^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos\theta & -\sin\theta \\ \sin\theta & \cos\theta \end{pmatrix} \begin{pmatrix} Vd^* \\ Vq^* \end{pmatrix} \cong \tag{3}$$

$$\begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos(\theta+\Delta\theta d) & -\sin(\theta+\Delta\theta d) \\ \sin(\theta+\Delta\theta d) & \cos(\theta+\Delta\theta d) \end{pmatrix} \begin{pmatrix} Vd^* \\ Vq^* \end{pmatrix}$$

The power converting unit 25 applies the voltages vu, vv, and vw to the synchronous machine 3 on the basis of the voltage commands vu*, vv*, and vw* using a known PWM control method or the like.

The magnetic flux estimating unit 26 first estimates an armature interlinkage flux Φ of the synchronous machine 3, more specifically, a d-axis component Φd of the armature interlinkage flux Φ. The armature interlinkage flux Φ means a combined flux of a magnetic flux (hereinafter, referred to as a permanent magnet flux) Φm formed by the permanent flux and a magnetic flux (armature reaction flux) Φa generated by the armature current.

As a suitable technique of estimating the armature interlinkage flux Φ, accurately, the d-axis component Φd thereof, a method of estimating the armature interlinkage flux Φ on the basis of Expression (4) which is a relational expression of the q-axis voltage vq and the d-axis component Φd on the d-q axes is used.

$$\Phi d = \frac{1}{\omega}\{vq - (R + Lq \cdot s) \cdot iq\} \cong \frac{1}{\omega}\{vq^* - R \cdot iq\} \tag{4}$$

Here, Lq represents the inductance in the q-axis direction (hereinafter, referred to as q-axis inductance) and Ld to be described later, which is not shown in Expression (4), represents the inductance in the d-axis direction (hereinafter, referred to as d-axis inductance). R represents the resistance (resistance value in which the resistance of the armature winding of the synchronous machine 3 is principal or resistance value in which wiring resistance is considered when the wiring between the synchronous machine 3 and the power converting unit 25 has a too large resistance value to neglect).

In addition, s represents a Laplace operator. The reciprocal 1/s of the Laplace operator s means one time of time integration.

In the configuration illustrated in FIG. 1 according to Embodiment 1, since the actual value of the q-axis voltage vq is not clear, the operation of Expression (4) is carried out using the q-axis voltage command vq* in the d-q axis voltage command output from the current command generating unit 23 instead of the q-axis voltage vq. The q-axis voltage command vq* is 0 and the d-axis component Φd of the armature interlinkage flux is 0 before the driving of the synchronous machine 3 is started. Accordingly, a predetermined permanent magnet flux Φm such as a reference value may be used as the initial value of Φd at the time of starting the driving of the synchronous machine 3.

In Expression (4), the rotational velocity ω of the synchronous machine 3 is used for the operation, and thus the rotational velocity ω is acquired by performing a differential operation using the position θ of the rotor detected by the position detecting unit 21. In Expression (4), the term including the Laplace operator s may be ignored by assuming that the variation in current is slow.

Regarding treatment of the resistance R, since the resistance value varies depending on the temperature of the synchronous machine 3, the temperature of the synchronous machine 3 may be detected to correct the resistance value R. When the term relevant to the resistance R is smaller than the other terms, the term including the resistance may be ignored to simplify the operation without using information on the armature currents of the synchronous machine 3 for the operation of estimating Φd and Φq. When the information on the armature currents of the synchronous machine 3 is not used, the operation of Expression (2) in the magnetic flux estimating unit 26 is not necessary.

The magnet state estimating unit 27 estimates the temperature or the magnetic flux of the permanent magnet forming a field magnet of the rotor which is a feature of the synchronous machine controller 2 according to Embodiment 1.

The operation of estimating the temperature or the magnetic flux of the permanent magnet is carried out in a state where the synchronous machine 3 is controlled on the basis of the torque command τ*, and is sporadically carried out under the conditions in which the value (absolute value) of the torque command is large and the temperature of the permanent magnet is likely to instantaneously rise or is continuously or intermittently carried out under the conditions in which a torque command other than zero is continuously given from the upper-level system and the temperature of the permanent magnet gradually rises as an example of an operating timing. When the operating timing of estimating the temperature or the magnetic flux of the permanent magnet is provided, it is possible to perform control so as to suppress the temperature of the permanent magnet to an allowable temperature or lower or to check a decrease of the torque generated in the synchronous machine 3 due to demagnetization, if necessary.

FIG. 3 is a diagram illustrating an example of a timing chart representing the relationship between the torque command τ* and the d-q axis current commands id* and iq* in the current command generating unit 23 of the synchronous machine controller 2 according to Embodiment 1.

As described above, the current command generating unit 23 generates the first current commands id* and iq* (=id1 and iq1) and the second current commands id* and iq* (=id2 and iq2) different from the first current commands on the basis of the same torque command τ* (=τ0), continuously applies the first current commands id* and iq* (=id1 and iq1) and the second current commands id* and iq* (=id2 and iq2) as the current command to drive the synchronous machine 3 under the conditions of two types of current commands as illustrated in FIG. 3. By employing this configuration, the magnet state estimating unit 27 can estimate the magnetic flux or the temperature of the permanent magnet of the synchronous machine 3 without greatly changing the normally-generated torque at the time of estimating the magnet flux.

In FIG. 3, before and after starting the magnet temperature estimating operation, the same first current commands id* and iq* (=id1 and iq1) are given. However, before starting the magnet temperature estimating operation, third current commands id* and iq* (=id3 and iq3) generated on the basis of the same torque command τ* and different from those just after starting the magnet temperature estimating operation may be given.

In general, since the (time constant of the) temperature variation of the permanent magnet is smaller than the (time constant of the) temperature variation of the armature winding, it can be considered that the temperature (magnetic flux) of the permanent magnet hardly varies by driving the synchronous machine while continuously giving two types of current commands within a time in which the temperature variation of the permanent magnet is small.

The magnet state estimating unit 27 estimates the temperature or the magnetic flux of the permanent magnet from the d-axis current id under the respective current command conditions and the d-axis component Φd of the armature interlinkage flux Φ estimated by the magnetic flux estimating unit 26. In the configuration of the magnet state estimating unit 27 illustrated in FIG. 1, it is assumed that the d-axis current id is acquired on the basis of the armature currents iu, iv, and iw of the synchronous machine 3 and the position θ of the rotor using the operation of Expression (2), but since the same operation is carried out by other constituent units as described above, the d-axis current id calculated by other constituent units may be used.

When the d-axis current at the time of giving the first current commands id* and iq* (=id1 and iq1) is defined as id10, the d-axis component of the armature interlinkage flux Φ at that time is defined as Φd10, the d-axis current at the time of giving the second current commands id* and iq* (=id2 and iq2) is defined as id20, and the d-axis component of the armature interlinkage flux Φ at that time is defined as Φd20, the relationship of Expression (5) is theoretically established.

$$\begin{cases} \Phi d10 = Ld \cdot id10 + \Phi m \\ \Phi d20 = Ld \cdot id20 + \Phi m \end{cases} \quad (5)$$

Here, the value of the d-axis inductance Ld generally varies depending on the current due to the influence of magnetic saturation of the synchronous machine 3. Since it is not easy to calculate in advance the accurate value of the d-axis inductance Ld by measurement or the like and an error is often present between the estimated value and the actual value of the d-axis inductance Ld. Accordingly, when the error ΔLd is present and the d-axis inductance Ld varies depending on the current due to the influence of magnetic saturation, the relationship of Expression (5) is actually expressed as the relationship of Expression (6).

$$\begin{cases} \Phi d10 = Ld10 \cdot id10 + \Phi m = (Ld'10 + \Delta Ld) \cdot id10 + \Phi m \\ \Phi d20 = Ld10 \cdot id20 + \Phi m = (Ld'20 + \Delta Ld)id20 + \Phi m \end{cases} \quad (6)$$

Here, Ld10 represents the actual value of the d-axis inductance Ld under the condition of the first current commands id* and iq* (=id1 and iq1), and Ld'10 represents the estimated value of the d-axis inductance Ld under the same condition. Ld20 represents the actual value of the d-axis inductance Ld under the condition of the second current commands id* and iq* (=id2 and iq2), and Ld'20 represents the estimated value of the d-axis inductance Ld under the same condition.

In Expression (6), since an unknown is the error ΔLd between the estimated value and the actual value of the d-axis inductance Ld, the permanent magnet flux Φm can be calculated using Expression (7) by erasing the error ΔLd from the upper and lower expressions thereof.

$$\Phi m = \frac{\Phi d10 \cdot id20 - \Phi d20 \cdot id10 + (Ld'20 - Ld'10) \cdot id10 \cdot id20}{id20 - id10} \quad (7)$$

By setting in advance the estimated value Ld'10 of the d-axis inductance Ld under the condition of the first current commands id* and iq* (=id1 and iq1) and the estimated value Ld'20 of the d-axis inductance Ld under the condition of the second current commands id* and iq* (=id2 and iq2), continuously giving the first current command and the second current command as the current command, and calculating the d-axis current id and the d-axis component Φd of the armature interlinkage flux Φ under the condition of the current commands while driving the synchronous machine 3 under two types of current command conditions, the permanent magnet flux Φm can be estimated on the basis of Expression (7).

Here, when id1 and id2 get close to each other insetting the first current commands id* and iq* (=id1 and iq1) and the second current commands id* and iq* (=id2 and iq2), the d-axis currents id10 and id20 flowing in accordance with the commands get close to each other, the denominator of Expression (7) becomes smaller, a slight error included in the denominator is amplified, and thus the estimation accuracy of the permanent magnet flux Φm degrades. Regarding id1 and id2, the magnitude of the difference between id1 and id2 has an upper limit due to limitations based on the same torque command τ* (=τ0).

Therefore, in setting the first current commands id* and iq* (=id1 and iq1) and the second current commands id* and iq* (=id2 and iq2), it is preferable that the ratio of id2 to id1 range from 0.5 to 0.8 or range from 1.25 to 2.

The setting of the estimated value of the d-axis inductance Ld is performed using a method of calculating a correlation between the d-axis current id, the q-axis current iq, and the estimated value of the d-axis inductance Ld in advance by techniques of known magnetic flux analysis, actual measurement, or the like and storing the correlation in the magnet state estimating unit 27 in the form of a correlation map or expression, or the like. In the operation of Expression (7), when the current follows the command value, the operation may be carried out using the command values id1 and id2 instead of the d-axis currents id10 and id20.

The permanent magnet temperature Tmag and the permanent magnet flux Φm have a correlation. By seeing the correlation, the estimated permanent magnet flux Φm may be converted into the estimated permanent magnet temperature Tmag. For example, when demagnetization occurs in a permanent magnet at a ratio of 1% every temperature rise of 10° C., the reference temperature is defined as Tb, and a (reference) permanent magnet flux at the temperature Tb is defined as ΦmTb, the relationship between the permanent magnet temperature Tmag and the permanent magnet flux Φm is expressed by Expression (8).

$$\Phi mag = \Phi mTb \cdot \{1 - (Tmag - Tb) \cdot 0.001\} \quad (8)$$

By using the relationship of Expression (8), the permanent magnet flux Φm can be converted into the estimated permanent magnet temperature Tmag.

Even when the same current commands are continuously given, pulsation components such as known current noise due to the PWM control of the power converting unit 25 or the shape of the synchronous machine 3 are actually superimposed on the d-axis current id or the d-axis component Φd of the armature interlinkage flux Φ. Accordingly, when the current commands are given for a predetermined period of time, an averaging process or a filtering process may be first performed on id10, Φid20, and Φd20 and then the operation of Expression (7) may be performed.

Figure 4:
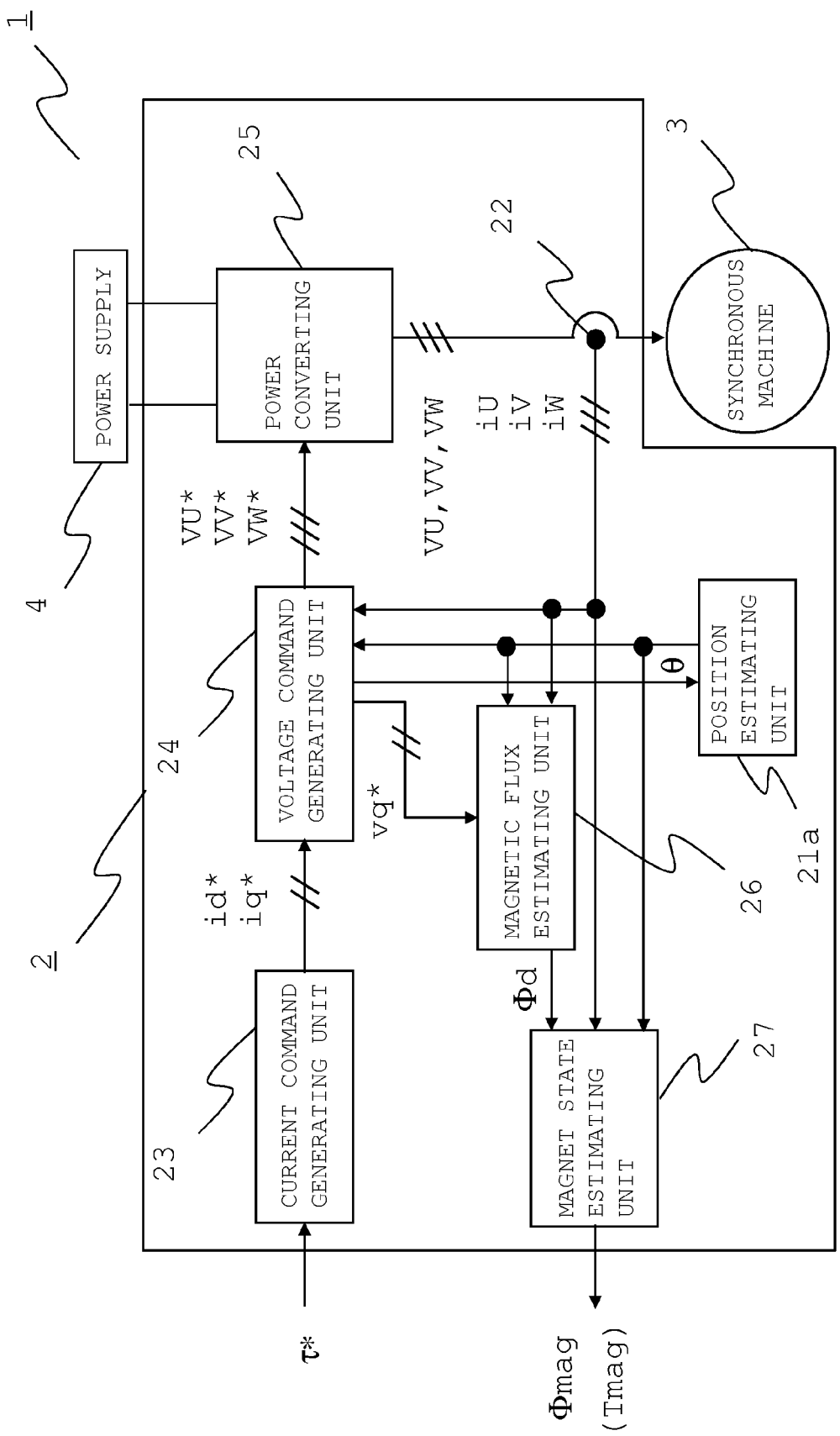
FIG. 4 is a diagram illustrating the entire synchronous machine system including another example of the synchronous machine controller according to Embodiment 1 and a synchronous machine.

FIG. 4 is a diagram illustrating an entire synchronous machine system including another example of the synchronous machine controller according to Embodiment 1 and a synchronous machine. In the example illustrated in FIG. 1, the position detecting unit 21 detects the position θ of the rotor of the synchronous machine 3 using a known resolver or encoder, or the like, but the synchronous machine controller 2 illustrated in FIG. 4 includes a position estimating unit 21a that estimates a position θ of a rotor by computation on the basis of a voltage command or armature current using a known adaptive observer or the like. The configuration of the position estimating unit 21a can be realized as the configuration described in Patent Literature 4 or Patent Literature 5 and thus will not be described herein. FIG. 1 is different from FIG. 4 in the position estimating unit 21a and FIG. 1 is the same as FIG. 4 in the other configuration, which will not be repeated.

In this way, in the synchronous machine controller according to Embodiment 1, by estimating the temperature or the magnetic flux of the permanent magnet forming a field magnet from the d-axis current obtained by transforming the armature current of the synchronous machine to the orthogonal two-axis coordinate system and the d-axis component of the armature interlinkage flux estimated by the magnetic flux estimating unit 26, it is possible to accurately estimate the magnetic flux or the temperature of the permanent magnet without greatly changing a normal torque and while suppressing deterioration of estimation accuracy due to the error between the set value and the actual value of inductance of the synchronous machine.

Embodiment 2

Figure 5:
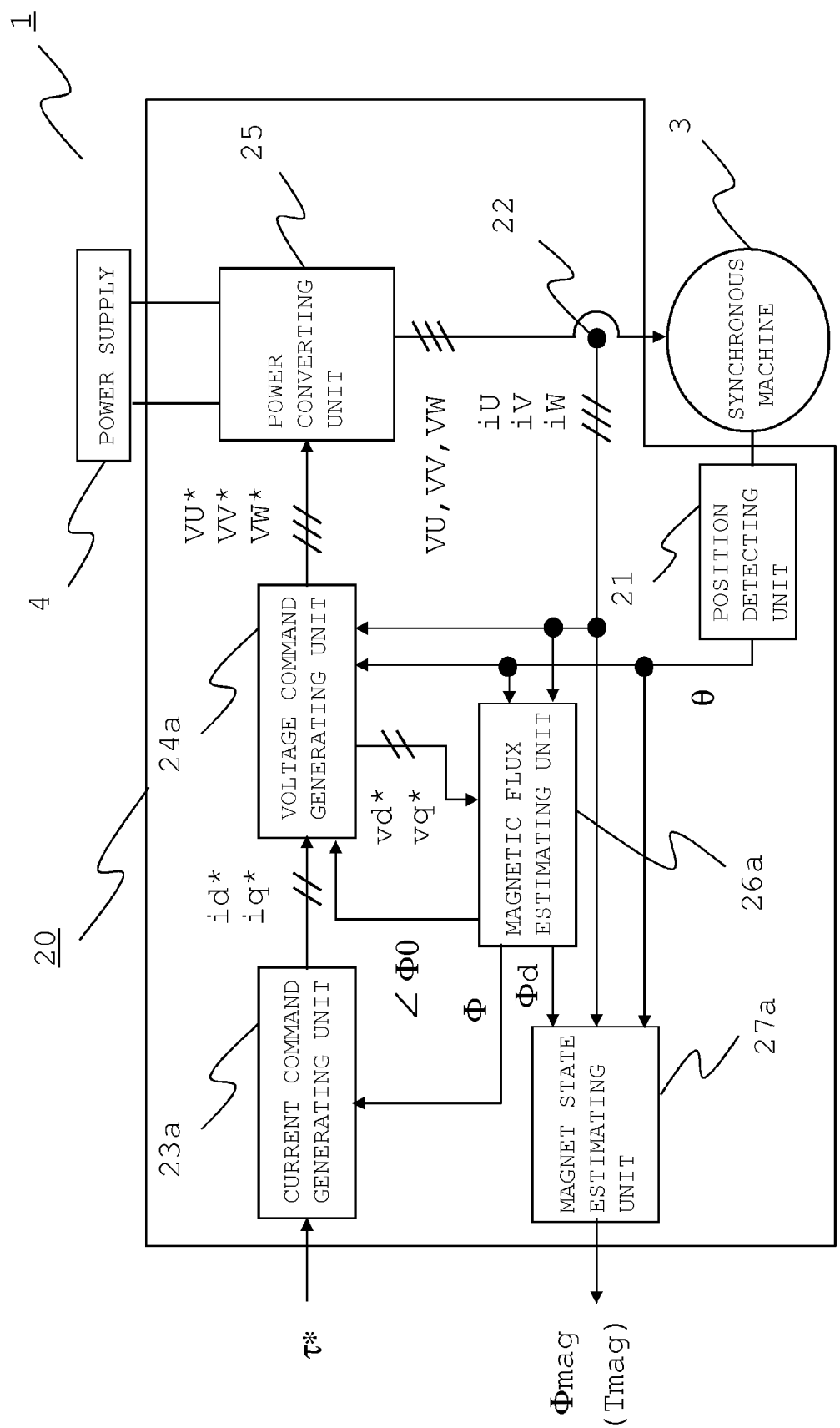
FIG. 5 is a diagram illustrating an entire synchronous machine system including a synchronous machine controller according to Embodiment 2 and a synchronous machine.

FIG. 5 is a diagram illustrating an entire synchronous machine system including another example of a synchronous machine controller according to Embodiment 2 and a synchronous machine. The synchronous machine controller 20 according to Embodiment 2 is different from the synchronous machine controller 2 according to Embodiment 1, in that a current command generating unit 23a generates current commands iγ* and iδ* on the basis of a torque command τ* and an armature magnetic flux Φ and a voltage command generating unit 24a generates voltage commands vd* and vq* in the orthogonal two-axis coordinate system on the basis of the currents iγ and iδ, which are obtained by coordinate-transforming the armature currents iu, iv, and iw to the orthogonal two-axis coordinate system on the basis of the current commands iγ* and iδ* and the position θ of the rotor, and the angle ∠Φ0 formed by the γ axis and the δ axis. The other elements are the same as in Embodiment 1 and description thereof will not be repeated.

The elements and operations of the synchronous machine controller 20 according to Embodiment 2 will be described with a focus on the differences from Embodiment 1 and the same parts will not be described again.

It has been stated in Embodiment 1 that the current command generating unit 23 generates the first current commands id* and iq* (=id1 and iq1) which are a group of the first d-axis current command id* (=id1) and the first q-axis current command iq* (=iq1) and the second current commands id* and iq* (=id2 and iq2) which are a group of the second d-axis current command id* (=id2) and the second q-axis current command iq* (=iq2) and which are different from the first current commands on the basis of the same torque command τ* (=τ0).

On the contrary, in Embodiment 2, first, an orthogonal two-axis (γ-δ axis) having the generating direction of the armature interlinkage flux Φ estimated by the magnetic flux estimating unit 26a as the γ axis and having the direction perpendicular to the γ axis as the δ axis is defined (the direction leading the γ axis by 90° is defined as the δ axis).

For the purpose of controlling the γ-axis current as a control value so as to match the armature interlinkage flux Φ with a desired magnetic flux command Φ* as a control value, the current command generating unit 23a includes a magnetic flux control unit 232 that generates a γ-axis current command on the basis of the magnetic flux command Φ* and the magnitude of the armature interlinkage flux Φ estimated by the magnetic flux estimating unit 26a, generates a first command group of a first δ-axis current command iδ* (=iδ1) and a first magnetic flux command Φ* (=Φ1) and a second command group of a second δ-axis current command iδ* (=iδ2) and a second magnetic flux command Φ* (=Φ2), which is different from the first command group, on the basis of the same torque command τ* (=τ0), and generates first current commands iγ* and iδ* (=iγ1 and iδ1) which are a group of a first γ-axis current command iγ* (=iγ1) and a first δ-axis current command as outputs when the first magnetic flux command Φ* (=Φ1) is input to the magnetic flux control unit 232 and second current commands iγ* and iδ* (=iγ2 and iδ2) as a group of a second γ-axis current command and a second δ-axis current command which are outputs when the second magnetic flux command is input to the magnetic flux control unit 232.

First, the magnetic flux estimating unit 26a, the current command generating unit 23a, and the voltage command generating unit 24a which are different from those of Embodiment 1 will be described below.

Figure 6:
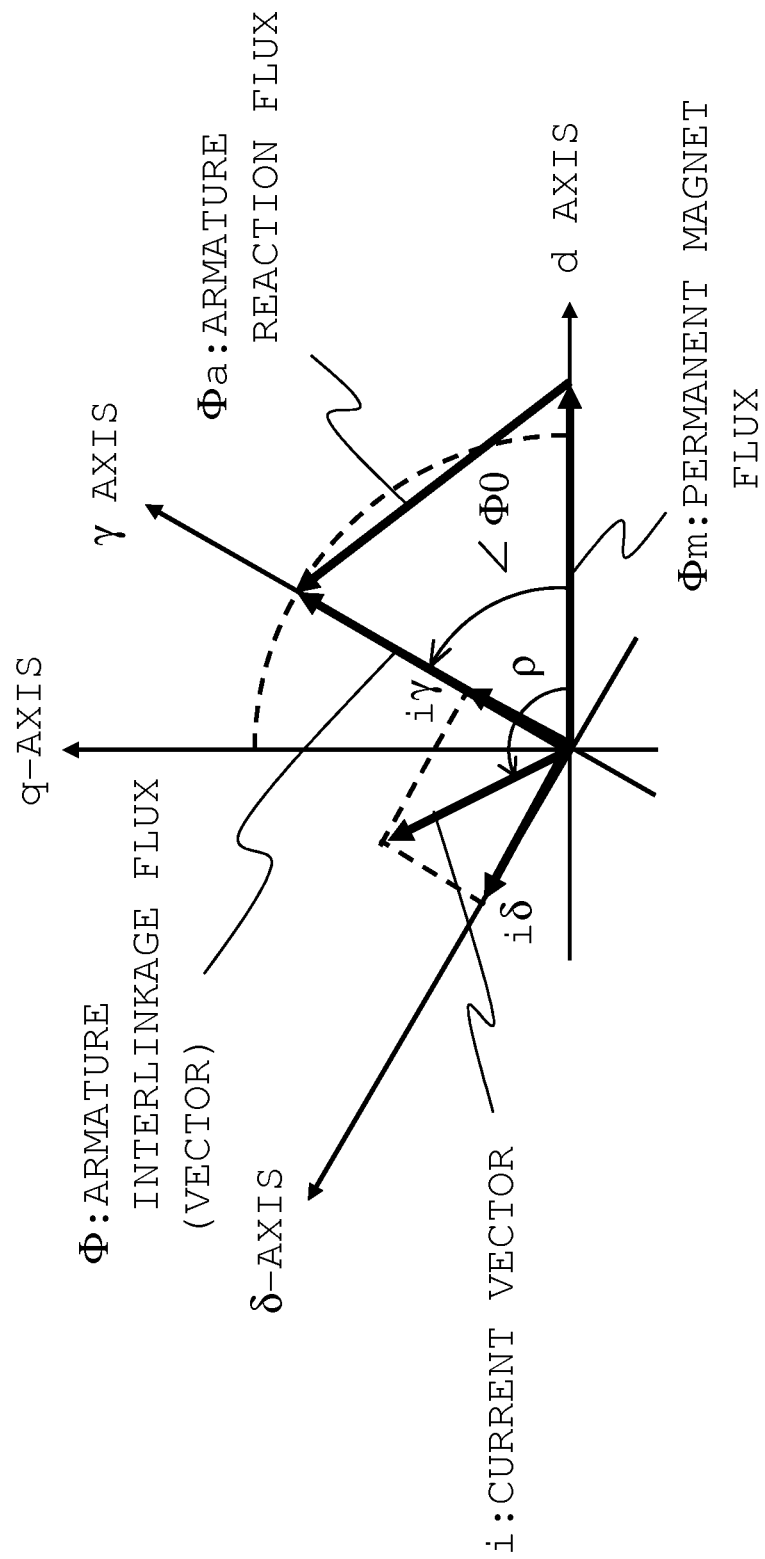
FIG. 6 is a vector diagram of a synchronous machine having a permanent magnet as a field magnet.

The magnetic flux estimating unit 26a estimates the magnitude |Φ| of the armature interlinkage flux Φ and the γ axis (actually, the angle ∠Φ0 of the estimated γ axis about the d axis) which is the generating direction of the armature interlinkage flux Φ, in addition to the armature interlinkage flux Φ of the synchronous machine 3, more specifically, the d-axis component Φd of the armature interlinkage flux Φ. FIG. 6 is a vector diagram of the synchronous machine 3 having a permanent magnet forming a field magnet of a rotor and illustrates a relationship between the γ-δ axes and the angle ∠Φ0 of the γ axis about the d axis, or the like.

Here, a very suitable technique of estimating the magnitude |Φ| of the armature interlinkage flux Φ and the angle ∠Φ0 will be described now. When estimating |Φ| and ∠Φ0, Φd and Φq are first calculated on the basis of Expression (1) and Expression (9) which is a relational expression of the d-axis voltage vd and the q-axis component Φq of the armature interlinkage flux Φ in the d-q axes, |Φ| is calculated using Expression (10) from the calculated Φd and Φq, and the angle ∠Φ0 is calculated using Expression (11).

$$\Phi q = -\frac{1}{\omega}\{vd - (R + Ld \cdot s) \cdot id\} \cong -\frac{1}{\omega}\{vd^* - R \cdot id\} \quad (9)$$

$$|\Phi| = \sqrt{\Phi d^2 + \Phi q^2} \quad (10)$$

$$\angle \Phi 0 = \tan^{-1}\left(\frac{\Phi q}{\Phi d}\right) \quad (11)$$

In the configuration illustrated in FIG. 5, since the actual value of the d-axis voltage vd is not clear, the operation of Expression (9) is carried out using the d-axis voltage command vd* in the d-q axis voltage commands output from the current command generating unit 23a to be described later instead of the d-axis voltage vd.

Figure 7:
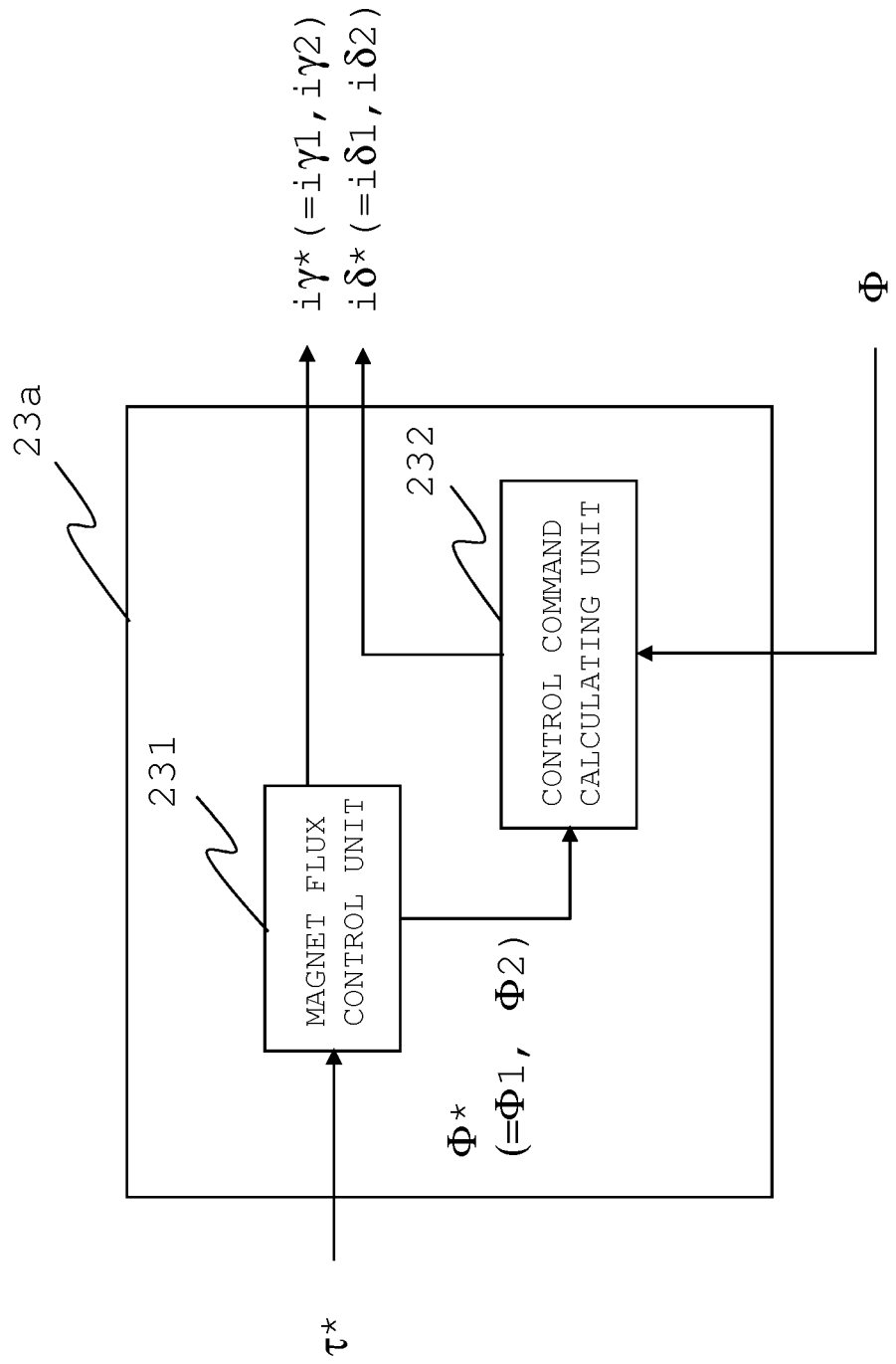
FIG. 7 is a configurational diagram illustrating an example of a current command generating unit in the synchronous machine controller according to Embodiment 2.

The current command generating unit 23a generates the γ-δ current commands iγ* and iδ* on the basis of the torque command τ*. FIG. 7 is a configuration diagram illustrating an example of the configuration of the current command generating unit 23a illustrated in FIG. 5.

In the synchronous machine 3 having a permanent magnet forming a field magnet of a rotor, since the relational expression of the torque τ and the δ-axis current iδ is expressed by Expression (12) using the armature interlinkage flux Φ, it is known that the number of combinations (Φ*, iδ*) of the δ-axis current command iδ* and the magnetic flux command Φ* capable of generating the same torque τ is countless. By directly controlling the armature interlinkage flux Φ and the δ-axis current iδ, it is possible to secure torque control accuracy even when thermal demagnetization occurs in the permanent magnet due to a temperature variation and the permanent magnet flux Φm varies.

数 12

$$\tau = Pm \cdot \Phi \cdot i\delta \quad (12)$$

Therefore, the control command calculating unit 231 of the current command generating unit 23a first generates a first command group iδ* and Φ* (=iδ1 and Φ1) of a first δ-axis current command iδ* (=iδ1) and a first magnetic flux command Φ* (=Φ1) and a second command group iδ* and Φ* (=iδ2 and Φ2) of a second δ-axis current command iδ* (=iδ2) and a second magnetic flux command Φ* (=Φ2) which is different from the first command group on the basis of the same torque command τ* (=τ0). Specifically, when a predetermined torque command τ* is input, the first command group iδ* and Φ* (=iδ1 and Φ1) and the second command group iδ* and Φ* (=iδ2 and Φ2) based on the torque command τ* are calculated in advance on the basis of Expression (12) the relationships are stored in the control command calculating unit 231 using a map or a numerical expression. Alternatively, the first command group iδ* and Φ* (=iδ1 and Φ1) and the second command group iδ* and Φ* (=iδ2 and Φ2) based on the torque command τ* with which the entire conversion efficiency of the synchronous machine 3 or the synchronous machine system 1 may be relatively suitable may be calculated in advance on the basis of actual machines and actual measurement, and the relationships therebetween may be stored in the control command calculating unit 231 using a map or a numerical expression. The magnetic flux control unit 232 controls the γ-axis current iγ as a control value so as to match the armature interlinkage flux Φ with a desired magnetic flux command Φ*.

Specifically, a γ-axis current command iγ* in which the flux difference ΔΦ between the magnetic flux command Φ* and the magnitude |Φ| of the armature interlinkage flux estimated by the magnetic flux estimating unit 26a is zero is generated. Since the γ-axis current iγ is a magnetization current which is a magnetization component of the synchronous machine 3, the armature interlinkage flux Φ can be controlled by the use of the γ-axis current iγ. Specifically, since the variation of the magnetization current and the variation of the armature interlinkage flux Φ have a proportional relationship with a proportional coefficient of the γ-axis inductance Lγ, for example, an integrator can be very suitably used as the controller for control of the flux difference ΔΦ to zero and the γ-axis current command iγ* is generated using the integral control operation expressed by Expression (13).

$$i\gamma^* = \frac{Kf}{s} \cdot \Delta\Phi = \frac{Kf}{s}(\Phi^* - |\Phi|) \quad (13)$$

Here, Kf represents an integral gain.

Accordingly, the current command generating unit 23a generates a first current commands iγ* and iδ* (=iγ1 and iδ1) as a group of a first γ-axis current command iγ* (=iγ1) and a first δ-axis current command iδ* which are outputs when the first magnetic flux command Φ* (=Φ1) is input to the magnetic flux control unit 232 and a second current commands iγ* and iδ* (=iγ2 and iδ2) as a group of a second γ-axis current command and a second δ-axis current command which are outputs when the second magnetic flux command is input to the magnetic flux control unit 232.

Figure 8:
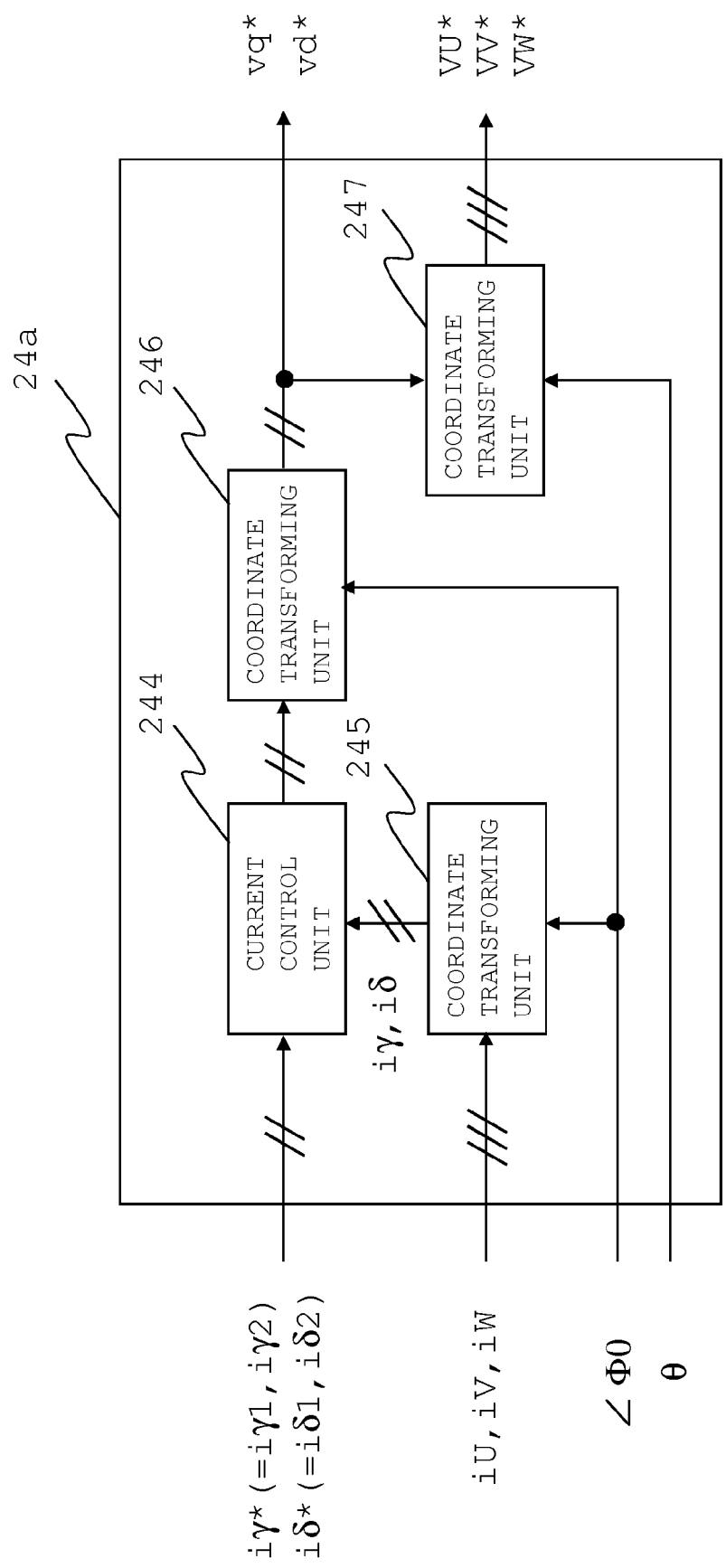
FIG. 8 is a configurational diagram illustrating an example of a voltage command generating unit in the synchronous machine controller according to Embodiment 2.

The voltage command generating unit 24a first outputs γ-δ axis voltage commands vγ* and vθ* so as to match the γ-δ axis currents iγ and iδ with the current commands iγ* and iδ*, then once coordinate-transforms vγ* and vδ* to the d-q axis voltage commands vd* and vq*, coordinate-transforms vd* and vq* to the multiphase (three-phase) AC voltage commands vu*, vv*, and vw*, and then outputs the resultant to the power converting unit 25. FIG. 8 is a configuration diagram illustrating an example of the configuration of the voltage command generating unit 24a illustrated in FIG. 5.

The coordinate transforming unit 245 coordinate-transforms the armature currents iu, iv, and iw of the synchronous machine 3 to the γ-δ axis currents iγ and iδ on the basis of the position θ of the rotor and the angle ∠Φ0 of the γ axis about the d axis using the operation of Expression (14).

$$\begin{pmatrix} i\gamma \\ i\delta \end{pmatrix} = \begin{pmatrix} \cos(\theta + \angle\Phi 0) & \sin(\theta + \angle\Phi 0) \\ -\sin(\theta + \angle\Phi 0) & \cos(\theta + \angle\Phi 0) \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} iu \\ iv \\ iw \end{pmatrix} \quad (14)$$

The current control unit 244 performs known proportional-integral control (PI control), for example, on the differences between the γ-δ axis current commands iγ* and iδ* and the γ-δ axis currents iγ and iδ and performs so-called current feedback control such as generating γ-δ axis voltage commands vγ* and vδ*. Although not illustrated in FIG. 8, similarly to Embodiment 1, the decoupling compensation may be performed on the γ-δ axis voltage commands vγ* and vδ* in a feed-forward manner.

The coordinate transforming unit 246 coordinate-transforms the γ-δ axis voltage commands vγ* and vδ* output from the current control unit 244 to the d-q axis voltage commands vd* and vq* using the operation of Expression (15) on the basis of the angle ∠Φ0 of the γ axis about the d axis. The coordinate transforming unit 247 transforms the resultant to the multiphase (three-phase) AC voltage commands vu*, vv*, and vw* using the operation of Expression (3) on the basis of the position θ of the rotor and outputs the resultant to the power converting unit 25.

$$\begin{pmatrix} Vd^* \\ Vq^* \end{pmatrix} = \begin{pmatrix} \cos(\angle\Phi 0) & -\sin(\angle\Phi 0) \\ \sin(\angle\Phi 0) & \cos(\angle\Phi 0) \end{pmatrix} \begin{pmatrix} v\gamma^* \\ v\delta^* \end{pmatrix} \quad (15)$$

Figure 9:
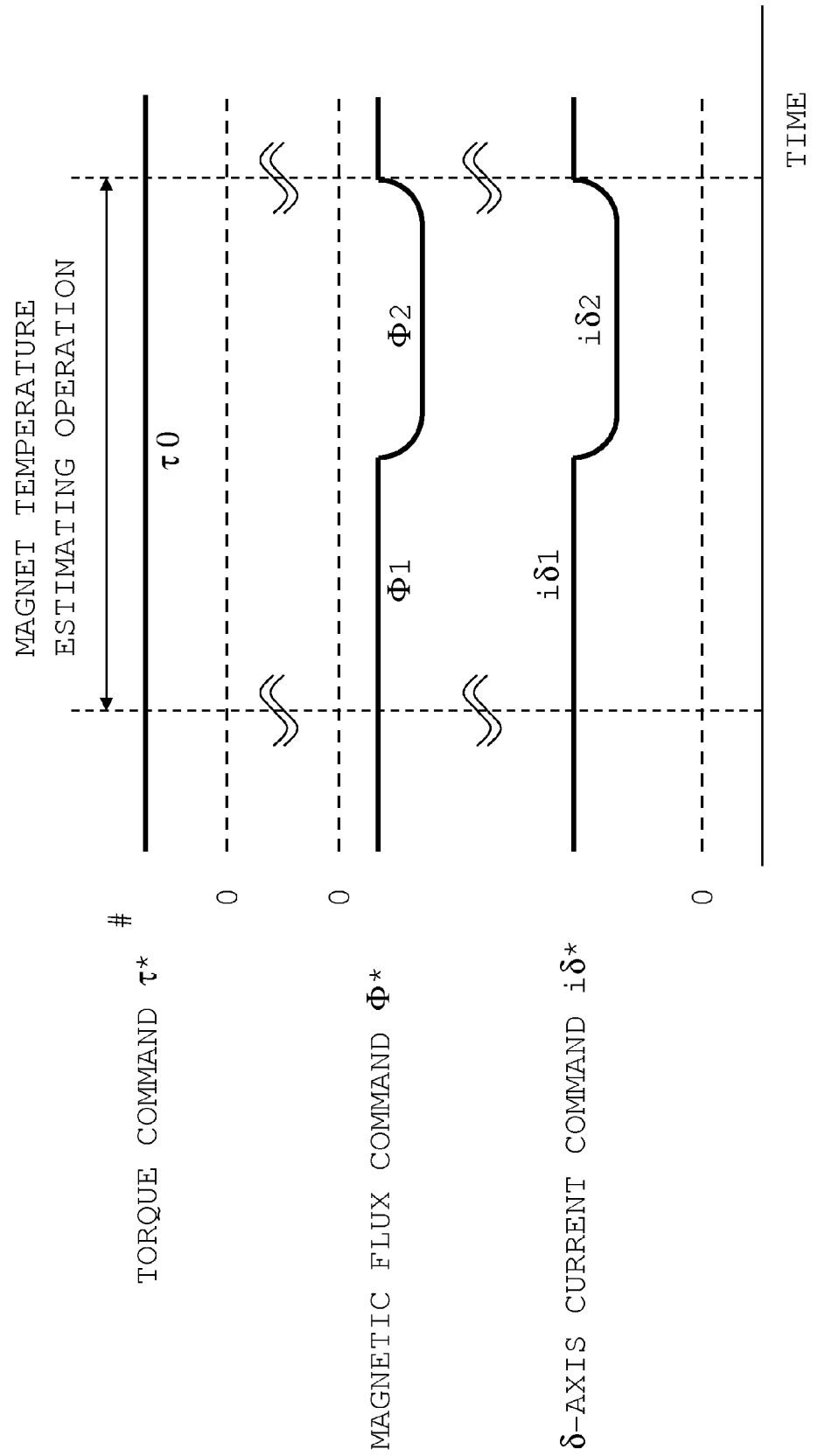
FIG. 9 is a diagram illustrating an example of a timing chart representing a relationship between a torque command and d-q axis current commands id* and iq* in the current command generating unit of the synchronous machine controller according to Embodiment 2.

The magnet state estimating unit 27a will be described below along with compensation for the current command generating unit 23a. FIG. 9 is a diagram illustrating an example of a timing chart representing the relationship between the torque command τ*, the magnetic flux command Φ*, and the δ-axis current command iδ* in the current command generating unit 23a.

The first command group of the first δ-axis current command iδ* (=iδ1) and the first magnetic flux command Φ* (=Φ1) and the second command group of the second δ-axis current command iδ* (=iδ2) and the second magnetic flux command Φ* (=Φ2), which is different from the first command group, are generated on the basis of the same torque command τ* (=τ0), and the first command group and the second command group are continuously given as illustrated in FIG. 9. The synchronous machine 3 is driven under two types of current command conditions of the first current commands iγ* and iδ* (=iγ1 and iδ1) as the group of the first γ-axis current command iγ* (=iγ1) and the first δ-axis current command which are output when the first magnetic flux command Φ* (=Φ1) is input to the magnetic flux control unit 232 and the second current commands iγ* and iδ* (=iγ2 and iδ2) as the group of the second γ-axis current command and the second δ-axis current command which are output when the second magnetic flux command is input to the magnetic flux control unit 232. In FIG. 9, the same first command group iγ* and iδ* (=iγ1 and iδ1) is given before performing the magnet temperature estimating operation and just after starting the magnet temperature estimating operation, but a third command group iγ* and iδ* (=iγ3 and iδ3) different from that just after starting the magnet temperature estimating operation and generated on the basis of the same torque command τ* may be given before starting the magnet temperature estimating operation.

Therefore, the magnet state estimating unit 27a to be described later can estimate the magnetic flux or the temperature of the permanent magnet of the synchronous machine 3 without greatly changing the torque normally generated at the time of estimating the magnet flux.

As described above, since the (time constant of the) temperature variation of the permanent magnet is generally smaller than the (time constant of the) temperature variation of the armature winding, it can be considered that the temperature (magnetic flux) of the permanent magnet hardly varies by driving the synchronous machine while continuously giving two types of current commands within a time in which the temperature variation of the permanent magnet is small.

The magnet state estimating unit 27a estimates the temperature or the magnetic flux of the permanent magnet from the d-axis current id under the respective current command conditions and the d-axis component Φd of the armature interlinkage flux Φ estimated by the magnetic flux estimating unit 26a. The operation of estimating the temperature or the magnetic flux of the permanent magnet is performed at the same timing as in Embodiment 1. The d-axis current id used for the estimation can be acquired on the basis of the armature currents iu, iv, and iw of the synchronous machine 3 and the position θ of the rotor using the operation of Expression (2).

When the d-axis current at the time of giving the first current commands iγ* and iδ* (=iγ1 and iδ1) is defined as id11, the d-axis component of the armature interlinkage flux Φ at that time is defined as Φd11, the d-axis current at the time of giving the second current commands iγ* and iδ* (=iγ2 and iδ2) is defined as id21, the d-axis component of the armature interlinkage flux Φ at that time is defined as Φd21, and the d-axis inductance Ld varies depending on the current due to the influence of magnetic saturation with an error ΔLd in the d-axis inductance Ld in the same way as in Embodiment 1, the relationship of Expression (16) is obtained.

$$\begin{cases} \Phi d11 = Ld11 \cdot id11 + \Phi m = (Ld'11 + \Delta Ld) \cdot id11 + \Phi m \\ \Phi d21 = Ld11 \cdot id21 + \Phi m = (Ld'21 + \Delta Ld) \cdot id21 + \Phi m \end{cases} \quad (16)$$

Here, Ld11 represents the actual value of the d-axis inductance Ld under the condition of the first current commands iγ* and iδ* (=iγ1 and iδ1), Ld'11 represents the estimated value of the d-axis inductance Ld under the same condition, Ld21 represents the actual value of the d-axis inductance Ld under the condition of the second current commands iγ* and iδ* (=iγ2 and iδ2), and Ld'21 represents the estimated value of the d-axis inductance Ld under the same condition.

In Expression (16), since an unknown is the error ΔLd between the estimated value and the actual value of the d-axis inductance Ld, the permanent magnet flux Φm can be calculated using Expression (17) by erasing the error ΔLd from the upper and lower expressions thereof.

$$\Phi m = \frac{\Phi d11 \cdot id21 - \Phi d21 \cdot id11 + (Ld'21 - Ld'11) \cdot id11 \cdot id21}{id21 - id11} \quad (17)$$

Here, when both settings get close to each other in setting the first command group iδ* and Φ* (=iδ1 and Φ1) and the second command group iδ* and Φ* (=iδ2 and Φ2), the d-axis currents id11 and id21 flowing in accordance with the commands get close to each other, the denominator of Expression (17) becomes smaller, a slight error included in the denominator is amplified, and thus the estimation accuracy of the permanent magnet flux Φm degrades. The setting of the ratio of iδ* and Φ* is limited due to current limitations determined depending on the synchronous machine 3 or the power converting unit 25.

Therefore, in setting the first command group iδ* and Φ* (=iδ1 and Φ1) and the second command group iδ* and Φ* (=iδ2 and Φ2), it is preferable that the ratio of Φ2 to Φ1 range from 0.5 to 0.8 or range from 1.25 to 2.

By setting in advance the estimated value Ld'11 of the d-axis inductance Ld under the condition of the first current commands iγ* and iδ* (=iγ1 and iδ1) and the estimated value Ld'21 of the d-axis inductance Ld under the condition of the second current commands iγ* and iδ* (=iγ2 and iδ2), continuously giving the first current command and the second current command as the current command, and calculating the d-axis current and the d-axis component of the armature interlinkage flux Φ under the condition of the current commands while driving the synchronous machine 3 under two types of current command conditions, the permanent magnet flux Φm can be estimated on the basis of Expression (17). As described above, the estimated permanent magnet flux Φm can be converted into the permanent magnet temperature Tmag.

As illustrated in the timing chart of FIG. 9, even when the same commands are continuously given, pulsation components such as known current noise due to the PWM control of the power converting unit 25 or the shape of the synchronous machine 3 are actually superimposed on the d-axis current or the d-axis component of the armature interlinkage flux Φ due to a variation of the γ-axis current command iγ* by disturbance due to the magnetic flux control unit 232. Accordingly, when the current commands are given for a predetermined period of time, an averaging process or a filtering process may be first performed on id11, Φd11, id21, and Φd21 and then the operation of Expression (17) may be performed.

In this way, in the synchronous machine controller according to Embodiment 2, in addition to the advantages of Embodiment 1, since the armature interlinkage flux and the δ-axis current command directly relevant to the torque can be directly controlled by generating the γ-axis current command from the armature interlinkage flux, it is possible to accurately estimate the magnetic flux or the temperature of the permanent magnet without greatly changing the normal torque even when thermal demagnetization occurs in the permanent magnet due to a temperature variation.

Embodiment 3

Figure 10:
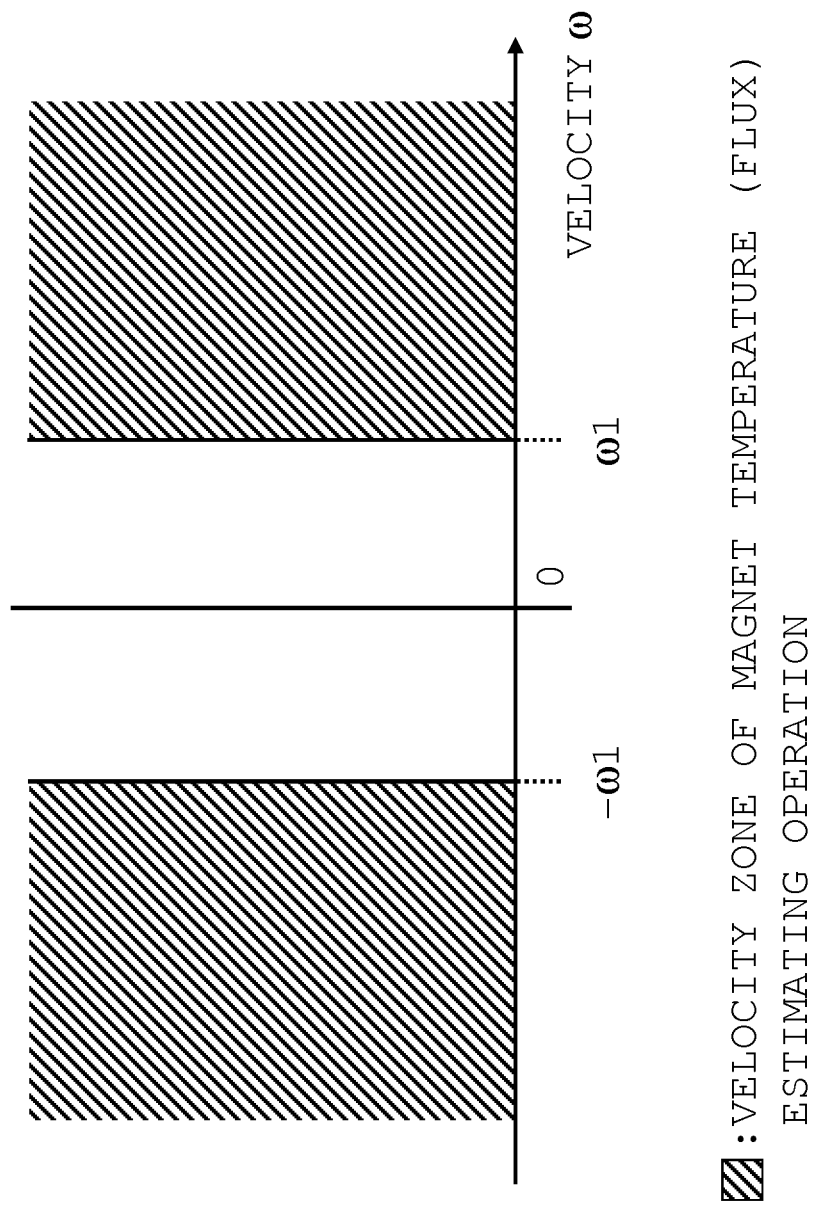
FIG. 10 is a diagram illustrating a velocity zone in which an operation of estimating a permanent magnet temperature (flux) in a synchronous machine controller according to Embodiment 3 is performed.
Figure 11:
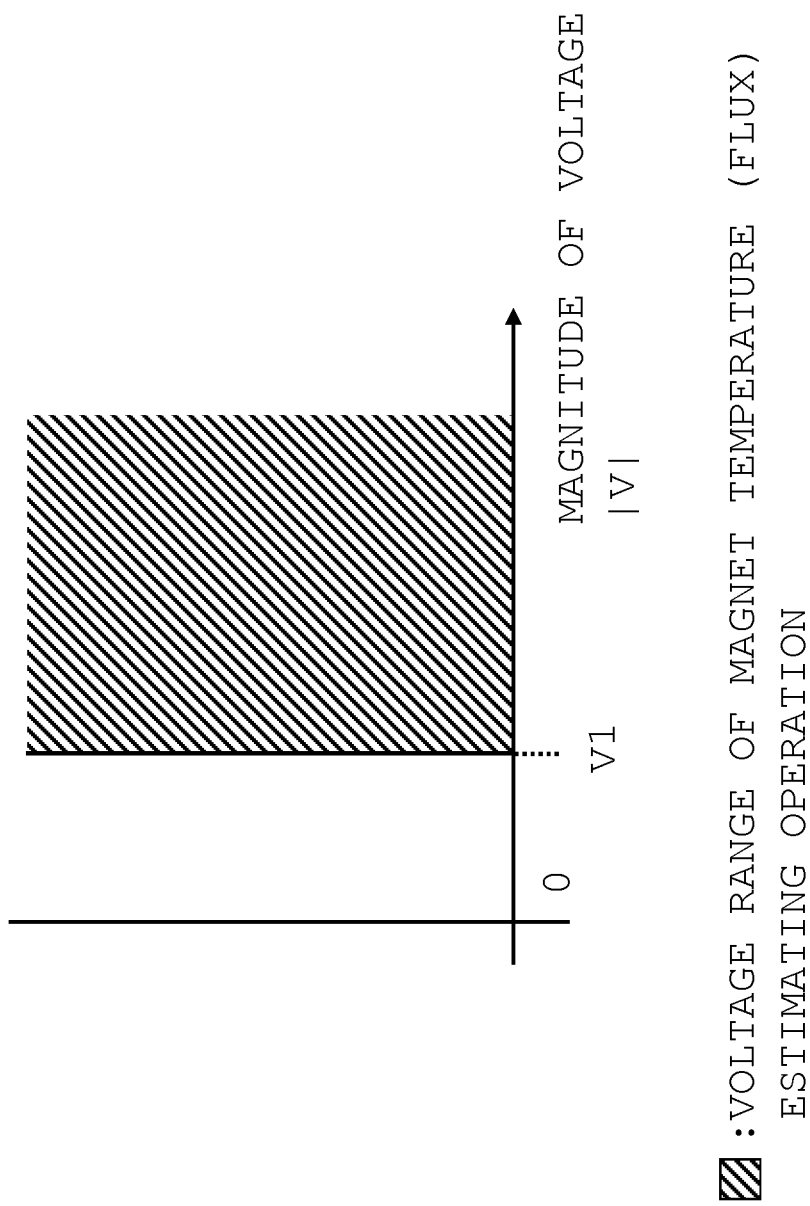
FIG. 11 is a diagram illustrating a voltage range in which the operation of estimating the permanent magnet temperature (flux) in the synchronous machine controller according to Embodiment 3 is performed.

FIG. 10 is a diagram illustrating a velocity zone in which an operation of estimating a permanent magnet temperature (flux) in a synchronous machine controller according to Embodiment 3 is performed. FIG. 11 is a diagram illustrating a voltage range in which an operation of estimating a permanent magnet temperature (flux) in the synchronous machine controller according to Embodiment 3 is performed. In the synchronous machine controller according to Embodiment 3, the range is limited in which the operation of estimating the magnetic flux or the temperature of the permanent magnet is performed by the magnet state estimating unit 27 or 27a according to Embodiment 1 or 2. The elements of the synchronous machine controller according to Embodiment 3 are the same as in Embodiment 1 or 2 and thus description thereof will not be repeated.

In a flow until the magnet state estimating unit 27 or 27a estimates the magnetic flux or the temperature of the permanent magnet of the synchronous machine 3, the magnetic flux estimating unit 26 or 26a performs an operation using the d-q axis voltage commands vd* and vq* instead of the d-q axis (actual) voltages vd and vq. This is on the premise that there is no difference between the d-q axis voltage commands vd* and vq* and the d-q axis (actual) voltages vd and vq, but the voltage output error (for example, a voltage error due to the dead time of an inverter) of the power converting unit 25 may actually affect a range in which the magnitude of the voltage is small or a low velocity zone in which the voltage decreases.

In consideration of this situation, in Embodiment 3, the operation of estimating the magnetic flux or the temperature of the permanent magnet of the synchronous machine 3 by the use of the magnet state estimating unit 27 or 27a is performed only when the absolute value of the rotational velocity ω of the synchronous machine 3 calculated from the variation of the position θ of the rotor is equal to or more than a predetermined value or only when the magnitudes of the voltage commands vu*, vv*, and vw* are equal to or more than a predetermined value.

Particularly, when the torque generated by the synchronous machine itself is used for acceleration, the operation of starting a supply of power from the zero velocity and generating a torque often exceeds a velocity zone which is easily affected by the voltage output accuracy of the power converting unit 25 before the influence of demagnetization of the permanent magnet due to a temperature rise. In this case, since the necessity for estimating the temperature (magnetic flux) of the permanent magnet in a low velocity zone is small, it is effective that the operation of estimating the temperature (magnetic flux) of the permanent magnet is carried out only when the absolute value of the rotational velocity ω of the synchronous machine 3 is equal to or more than a predetermined value.

FIG. 10 is a diagram illustrating a velocity zone in which the operation of estimating the magnetic flux or the temperature of the permanent magnet is performed. As illustrated in the drawing, the operation of estimating the temperature (magnetic flux) of the permanent magnet of the synchronous machine 3 is not performed by the magnet state estimating unit 27 or 27a under the condition in which the rotational velocity is equal to or less than a predetermined velocity ω1 (a range of −ω1 to ω1 in consideration of a negative velocity) which may be affected by the voltage accuracy, that is, under the condition in which |ω|<ω1 is satisfied.

From the viewpoint of reducing the influence of the voltage output error of the power converting unit 25, a method based on the magnitude |V| of the voltage commands vu*, vv*, and vw* instead of the rotational velocity ω of the synchronous machine 3 may be employed. In the invention, the magnitude |V| of the voltage commands vu*, vv*, and vw* is defined by Expression (18) (corresponding to the voltage amplitude), but the magnitude (amplitude or effective value) of the voltage commands vu*, vv*, and vw* may be calculated without complying with Expression (18).

$$|V| = \sqrt{\frac{2}{3}(vu^{*2} + vv^{*2} + vw^{*2})} \qquad (18)$$

FIG. 11 is a diagram illustrating a voltage range in which the operation of estimating the magnetic flux or the temperature of the permanent magnet is performed. As illustrated in the drawing, the operation of estimating the temperature (magnetic flux) of the permanent magnet of the synchronous machine 3 is not performed by the magnet state estimating unit 27 or 27a under the condition in which the voltage is equal to or less than a predetermined voltage magnitude V1 which may be affected by the voltage accuracy, that is, under the condition in which |V|<V1 is satisfied.

Accordingly, since the operation of estimating the temperature (magnetic flux) of the permanent magnet is performed only in a high velocity zone or a high voltage range in which the voltage output accuracy of the power converting unit 25 is higher, it is possible to enhance the estimation accuracy.

In this way, in the synchronous machine controller according to Embodiment 3, in addition to the advantages of Embodiment 1 or 2, by performing the operation of estimating the magnetic flux or the temperature of the permanent magnet only in a velocity zone in which the voltage output accuracy of the power converting unit is higher, the operation of estimating the magnetic flux or the temperature of the permanent magnet is performed only when the estimation accuracy is high in the magnetic flux estimating unit that estimates the armature interlinkage flux of the synchronous machine on the basis of the voltage command and it is thus possible to perform the estimation with high accuracy.

Embodiment 4

Figure 12:
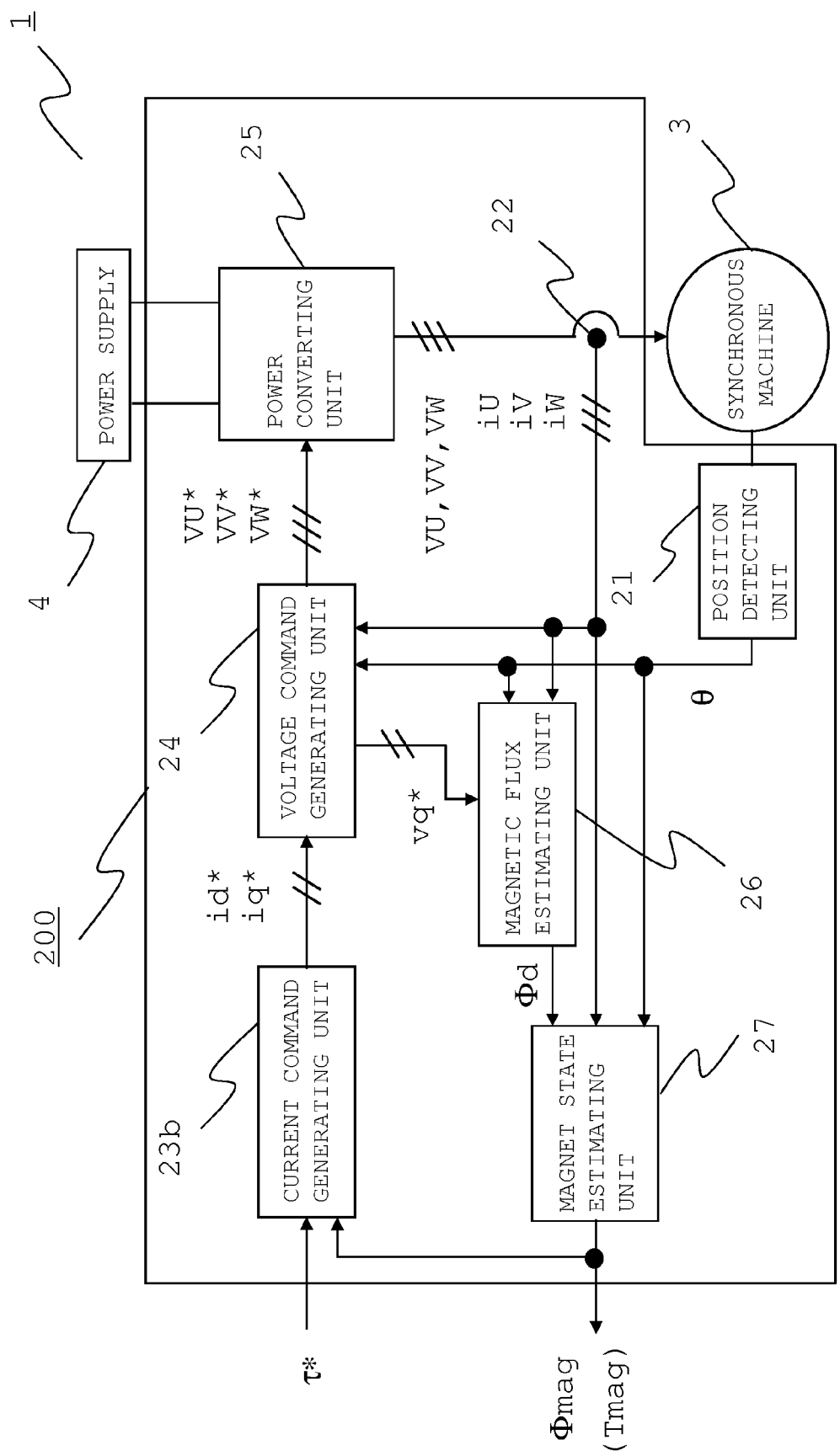
FIG. 12 is a diagram illustrating an entire synchronous machine system including a synchronous machine controller according to Embodiment 4 and a synchronous machine.

FIG. 12 is a diagram illustrating an entire synchronous machine system including a synchronous machine controller according to Embodiment 4 and a synchronous machine. The synchronous machine controller 200 according to Embodiment 4 is different from the synchronous machine controller 2 according to Embodiment 1, in that the current command generating unit 23b limits the torque command τ* to the synchronous machine 3 on the basis of the permanent magnet flux Φmag or the permanent magnet temperature Tmag output from the magnet state estimating unit 27 and the d-q axis current commands id* and iq* are generated on the basis of the limited torque command τ0*. The other elements are the same as in Embodiment 1 and description thereof will not be repeated.

As described above, when the synchronous machine 3 having a rotor in which a field magnet is formed of a permanent magnet is controlled with the synchronous machine controller 2 having the power converting unit 25, a phenomenon called "demagnetization" occurs in which the intensity of magnetization, that is, the magnetic flux, of the permanent magnet as a field magnet decreases with a rise in temperature due to supply of current to an armature winding of the synchronous machine 3, and a phenomenon called "irreversible demagnetization" occurs in which the magnetic flux does not return to the state before the occurrence of demagnetization even when the temperature once exceeds an allowable temperature and then falls to the normal temperature. Accordingly, at least the temperature of the permanent magnet has to be suppressed to be equal to or less than the allowable temperature at which the irreversible demagnetization occurs. Particularly, when the torque generated in the synchronous machine 3 increases, the temperature of the permanent magnet is likely to rise.

Particularly, when the functions of Embodiment 4 are added to Embodiment 2, the γ-axis current iγ corresponds to the magnetization current controlling the armature interlinkage flux Φ of the synchronous machine 3 as described above. When the demagnetization (decrease in magnet flux corresponding to ΔΦmag) of the permanent magnet due to a rise in temperature occurs and the magnetic flux command Φ* is equal to that before the demagnetization, the magnet flux corresponding to the demagnetization is compensated for by an increase of the γ-axis current iγ.

Therefore, since the armature current (effective value) of the synchronous machine 3 increases with the increase of the γ-axis current iγ, the temperature of the entire synchronous machine 3 including the permanent magnet rises due to heat (for example, heat generated due to the resistance of the armature winding) generated in the synchronous machine 3 and thus the demagnetization of the permanent magnet may advance.

Therefore, in order to suppress an additional rise in temperature and the exceeding of the upper limit of the armature current of the synchronous machine 3 when the temperature of the synchronous machine 3 rises, the magnitudes (absolute values) of Φ* and iδ* in the d-q axis current commands id* and iq* or the group of the δ-axis current command iδ* and the magnetic flux command Φ* are indirectly reduced to suppress an increase of the armature current (effective value), by determining the temperature rise of the permanent magnet on the basis of the permanent magnet flux Φmag or the permanent magnet temperature Tmag output from the magnet state estimating unit 27 or 27a and limiting the torque command τ* depending on Φmag (or Tmag). The correlation between the estimated value Φmag (or Tmag) estimated by the magnet state estimating unit 27 or 27a and the limit value τ0* of the torque command is set depending on the driving condition, the heat capacity or the cooling performance of the synchronous machine 3, or the performance of the power converting unit 25.

When the estimated value Φmag estimated by the magnet state estimating unit 27 or 27a is equal to or less than a certain value or Tmag is higher than a predetermined temperature, it is determined that the permanent magnet temperature gets close to the temperature at which the irreversible demagnetization occurs, a process of lowering the torque command τ*, extremely, to "0" is performed, and then the torque command τ0* (after being limited) is output.

In Embodiment 2, a configuration in which the control command calculating unit 231 limits the torque command τ* to the synchronous machine 3 depending on the permanent magnet flux Φmag or the permanent magnet temperature Tmag output from the magnet state estimating unit and the δ-axis current command iδ* and the magnetic flux command Φ* are generated on the basis of the limited torque command τ0* may be employed.

In this way, in the synchronous machine controller according to Embodiment 4, in addition to the advantages of Embodiment 1 or 2, by limiting the torque command at the time of rising in the temperature of the permanent magnet of the synchronous machine so as to suppress an additional rise in temperature, it is possible to limit an increase in armature current (effective value) and thus to prevent the irreversible demagnetization.

Embodiment 5

Unlike the magnet state estimating units 27 and 27a in Embodiments 1 to 4, the magnet state estimating unit of a synchronous machine controller according to Embodiment 5 is configured to have a function of estimating the error $\Delta Ld$ of the d-axis inductance Ld at the time of estimating the magnetic flux or the temperature of the permanent magnet of the synchronous machine 3 and storing the estimated error $\Delta Ld$. The other elements are the same as in Embodiment 1 and thus description thereof will not be repeated.

In Embodiments 1 to 4, when the permanent magnet flux $\Phi m$ is estimated on the basis of Expression (7) or (17), the d-axis component $\Phi d$ of the armature interlinkage flux $\Phi$ and the permanent magnet flux $\Phi m$ are known and thus it is possible to calculate the error $\Delta Ld$ of the d-axis inductance Ld and also to calculate the actual value of the d-axis inductance Ld. For example, in Embodiment 1, the error $\Delta Ld$ of the d-axis inductance Ld can be calculated using Expression (19) from the relationship with the permanent magnet flux $\Phi m$ estimated from the d-axis current id10, the d-axis component $\Phi d10$ of the armature interlinkage flux $\Phi$, and the estimated value Ld'10 of the d-axis inductance Ld under the condition in which the first current commands id* and iq* (=id1 and iq1) are given.

$$\Delta Ld = \frac{\Phi d10 - \Phi m}{id10} - Ld'10 \qquad (19)$$

The error $\Delta Ld$ of the d-axis inductance Ld can also be similarly calculated using the values under the conditions in which the second current commands id* and iq* (=id2 and iq2) are given in Embodiment 1 or using the values under the condition in which the first or second current commands are given in Embodiment 2.

At the time of estimating the magnetic flux or the temperature of the permanent magnet, the magnet state estimating unit 27 estimates the error $\Delta Ld$ of the d-axis inductance Ld on the basis of Expression (19) and stores the estimated error $\Delta Ld$. The stored error $\Delta Ld$ is used at the time of estimating the magnetic flux or the temperature of the permanent magnet again. Accordingly, even when two patterns of current commands of the first current command and the second current command different from the first current command are not given on the basis of the same torque command, only the permanent magnet flux $\Phi mag$ in the relationship of Expression (6) or (16) is unknown and it is thus possible to estimate the magnetic flux or the temperature of the permanent magnet using only a group of current commands generated on the basis of the torque command $\tau^*$.

Therefore, at the time of estimating the magnetic flux or the temperature of the permanent magnet again, the methods of giving a current command is changed from two groups to one group and it is thus possible to shorten the time necessary for estimating the magnetic flux or the temperature of the permanent magnet.

By using the fact that the actual value of the d-axis inductance Ld can be calculated from the error $\Delta Ld$ of the d-axis inductance Ld and the estimated value of the d-axis inductance Ld, the estimated value may be replaced with the calculated actual value when the correlation of the d-axis current, the q-axis current, and the d-axis inductance Ld (estimated value) is stored as described above.

In this way, in the synchronous machine controller according to Embodiment 5, in addition to the advantages of Embodiments 1 to 4, by estimating and storing the error of the d-axis inductance at the time of estimating the magnetic flux or the temperature of the permanent magnet, it is possible to estimate the magnetic flux or the temperature of the permanent magnet under the condition in which a group of current commands is given at the time of estimating the magnetic flux or the temperature of the permanent magnet again, and thus to shorten the time necessary for the estimation.

Embodiment 6

Figure 13:
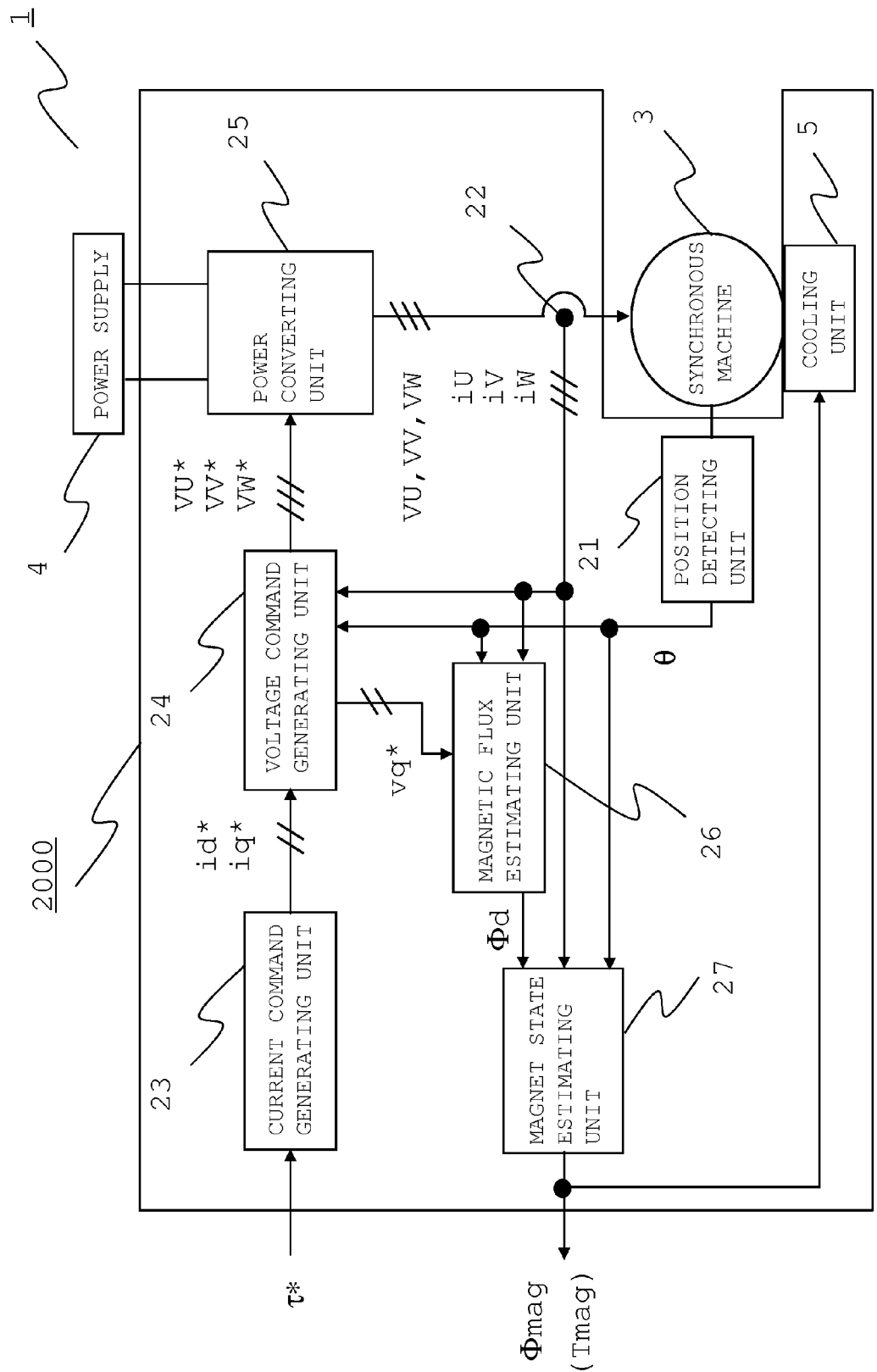
FIG. 13 is a diagram illustrating an entire synchronous machine system including a synchronous machine controller according to Embodiment 6 and a synchronous machine.

FIG. 13 is a diagram illustrating an entire synchronous machine system including a synchronous machine controller according to Embodiment 6 and a synchronous machine. The synchronous machine controller 2000 according to Embodiment 6 is different from the synchronous machine controller 2 according to Embodiment 1, in that a cooling unit 5 for cooling the synchronous machine 3 is further provided and the cooling unit 5 is controlled depending on the permanent magnet flux $\Phi mag$ or the permanent magnet temperature Tmag output from the magnet state estimating unit 27. The other elements are the same as in Embodiment 1 and description thereof will not be repeated.

The cooling unit 5 detects a rise in temperature of the synchronous machine 3 on the basis of the permanent magnet flux $\Phi mag$ or the permanent magnet temperature Tmag output from the magnet state estimating unit 27, activates a cooler so as to lower the temperature of the synchronous machine 3, for example, when the temperature is higher than a predetermined temperature threshold. In a specific example, the cooler includes a cooling fan and is configured to raise the number of revolutions of the cooling fan so as to increase an amount of wind blown out to the synchronous machine 3 when the temperature rises.

In another example of the cooling unit 5, a combined configuration of a known radiator and a circulation pump in which a flow channel is formed in a housing part of the synchronous machine 3 and the synchronous machine 3 is cooled by causing a liquid such as water to pass through the flow channel may be employed. In this case, the flow rate of the circulation pump is adjusted to be variable on the basis of the permanent magnet flux $\Phi mag$ or the permanent magnet temperature Tmag output from the magnet state estimating unit 27.

The configuration such as the cooling unit 5 added in Embodiment 6 can be applied to Embodiments 2 to 5.

In this way, in the synchronous machine controller according to Embodiment 6, in addition to the advantages of Embodiments 1 to 5, since the synchronous machine can be appropriately cooled, it is possible to suppress the rise in temperature of the entire synchronous machine or the permanent magnet of the synchronous machine and to prevent the degradation of the entire synchronous machine or the irreversible demagnetization of the permanent magnet.

Embodiment 7

Figure 14:
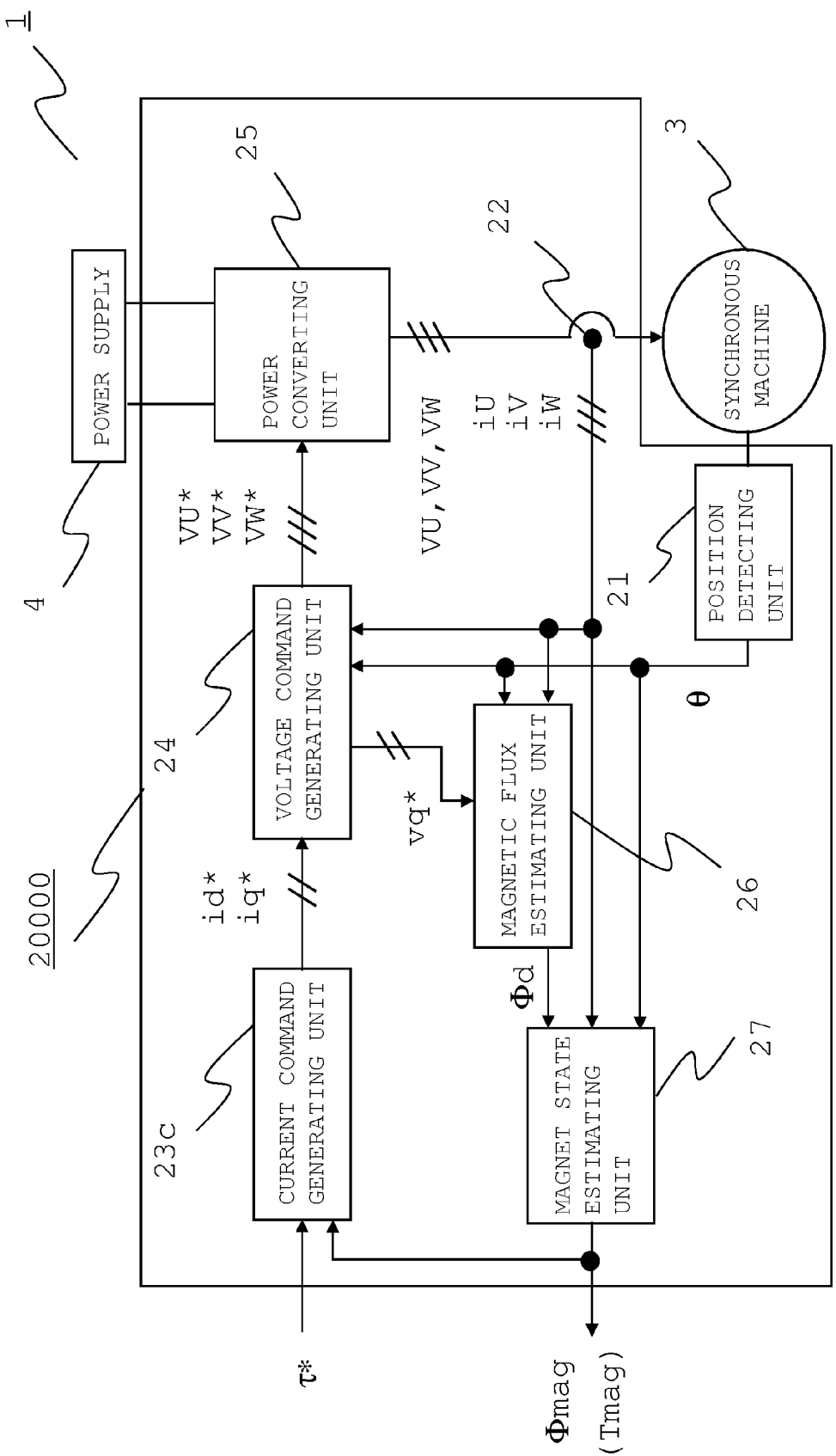
FIG. 14 is a diagram illustrating an entire synchronous machine system including a synchronous machine controller according to Embodiment 7 and a synchronous machine.

FIG. 14 is a diagram illustrating an entire synchronous machine system including a synchronous machine controller according to Embodiment 7 and a synchronous machine. The synchronous machine controller 20000 according to Embodiment 7 is different from the synchronous machine controller 2 or 20 according to Embodiment 1 or 2, in that the current command generated on the basis of the torque command $\tau^*$ to the synchronous machine 3 by the current command generating unit 23c is set to a command for reducing the absolute value of the rotational velocity of the synchronous machine 3 depending on the permanent magnet flux Φmag or the permanent magnet temperature Tmag output from the magnet state estimating unit 27 and thus the synchronous machine 3 is decelerated. The other elements are the same as in Embodiment 1 or 2 and description thereof will not be repeated.

In order to suppress advancement of the demagnetization of the permanent magnet with a rise in temperature of the synchronous machine 3, this embodiment is designed to reduce iron loss (eddy-current loss) associated with (the absolute value of) the rotational velocity and generated in the synchronous machine 3 and to suppress the rise in temperature of the synchronous machine 3 due to the iron loss (eddy-current loss), by determining the rise in temperature of the permanent magnet on the basis of the permanent magnet flux Φmag or the permanent magnet temperature Tmag output from the magnet state estimating unit 27a and setting the current command generated on the basis of the torque command τ* to a command for reducing the absolute value of the rotational velocity of the synchronous machine 3 depending on Φmag (or Tmag) to decelerate the synchronous machine 3.

In an example where the current command is generated, a torque command τ* of a predetermined negative value is input to the current command generating unit 23c to generate a current command by changing the torque command τ* input to the current command generating unit 23c to a predetermined negative value, or requesting an upper-level system of the synchronous machine system 1 to input a predetermined negative value as a torque command τ* to the current command generating unit 23c from the upper-level system. Accordingly, the d-q axis current commands id* and iq* or the group of the δ-axis current command iδ* and the a magnetic flux command Φ* is indirectly changed to a command for a regenerative operation to decelerate the synchronous machine 3.

The correlation between the estimated value Φmag (or Tmag) estimated by the magnet state estimating unit 27 or 27a and the torque command τ0* capable of decelerating the synchronous machine 3 is set depending on the driving condition, the heat capacity or the cooling performance of the synchronous machine 3, or the performance of the power converting unit 25.

In this way, in the synchronous machine controller according to Embodiment 7, in addition to the advantages of Embodiment 1 or 2, by setting a command for reducing the absolute value of the rotational velocity of the synchronous machine 3 when the temperature of the permanent magnet of the synchronous machine rises and decelerating the synchronous machine 3, it is possible to reduce the iron loss (eddy-current loss) generated in the synchronous machine 3, to suppress a rise in temperature due to the iron loss (eddy-current loss), and thus to prevent the irreversible demagnetization.

In the above-mentioned embodiments, the current commands and the operations when the magnetic flux or the temperature is periodically estimated have been described, but the synchronous machine has only to be driven using a group of current commands at the normal time and two groups of current commands do not need to be always given.

In the above description of the embodiments, a synchronous electric motor is assumed as the synchronous machine, but the same advantages can be expected when a synchronous power generator or a synchronous AC machine using a permanent magnet is employed.

Note that, the present invention is not limited to the above-mentioned embodiments and the embodiments may be modified or omitted as appropriate without departing from the scope of the present invention. Various modifications and alternations of this invention will be apparent to those skilled in the art without departing from the scope and sprit of this invention, and it should be understood that this is not limited to the illustrative embodiments set forth herein.

What is claimed is:

1. A synchronous machine controller comprising:
    a position detecting unit that detects a position of a rotor of a synchronous machine including the rotor in which a field magnet is formed of a permanent magnet or a position estimating unit that estimates the position of the rotor;
    a current detecting unit that detects an armature current of the synchronous machine;
    a current command generating unit that generates first and second current commands transformed to an orthogonal two-axis coordinate system on the basis of a torque command;
    a voltage command generating unit that generates a voltage command on the basis of the first and second current commands, the position of the rotor, and the armature current;
    a power converting unit that outputs a voltage to the synchronous machine on the basis of the voltage command;
    a magnetic flux estimating unit that estimates an armature interlinkage flux of the synchronous machine on the basis of a rotational velocity of the synchronous machine calculated from a variation of the position of the rotor, the voltage command, and the armature current; and
    a magnet state estimating unit that estimates a magnetic flux or a temperature of the permanent magnet from the position of the rotor, the armature current, and the armature interlinkage flux.

2. The synchronous machine controller according to claim 1, wherein the orthogonal two-axis coordinate system is a rotary orthogonal two-axis (d-q axes) coordinate system, and
    wherein the current command generating unit generates the first current command, which is a group of a first d-axis current command and a first q-axis current command, and the second current command, which is a group of a second-d-axis current command and a second q-axis current command on the basis of the torque command.

3. The synchronous machine controller according to claim 1, wherein the orthogonal two-axis coordinate system is an orthogonal two-axis (γ-δ axes) coordinate system with a generating direction of the armature interlinkage flux estimated by the magnetic flux estimating unit as a γ axis and with a direction perpendicular to the γ axis as a δ axis, and
    wherein the current command generating unit includes a control command calculating unit that issues a δ-axis current command and an armature interlinkage flux command on the basis of the torque command and a magnetic flux control unit that outputs a γ-axis current command on the basis of the armature interlinkage flux command and the armature interlinkage flux estimated by the magnetic flux estimating unit, and generates the first current command which is a group of a first γ-axis current command and a first δ-axis current command and the second current command which is a group of a second γ-axis current command and a second δ-axis current command.

4. The synchronous machine controller according to claim 1, wherein the magnet flux or the temperature of the permanent magnet is estimated by the magnet state estimating unit only when the absolute value of the rotational velocity of the synchronous machine calculated from the variation of the position of the rotor is equal to or greater than a predetermined value.

5. The synchronous machine controller according to claim 1, wherein the magnet flux or the temperature of the permanent magnet is estimated by the magnet state estimating unit only when the magnitude of the voltage command is equal to or greater than a predetermined value.

6. The synchronous machine controller according to claim 1, wherein the current command generating unit restricts the current commands depending on the magnetic flux or the temperature of the permanent magnet output from the magnet state estimating unit.

7. The synchronous machine controller according to claim 1, wherein the current command generating unit generates the current commands so as to reduce the absolute value of the rotational velocity of the synchronous machine depending on the magnetic flux or the temperature of the permanent magnet output from the magnet state estimating unit.

8. The synchronous machine controller according to claim 1, wherein the magnet state estimating unit estimates the magnetic flux or the temperature of the permanent magnet, estimates an error between an estimated value and an actual value of inductance of the synchronous machine, and stores the estimated value.

9. The synchronous machine controller according to claim 1, further comprising a cooling unit that cools the synchronous machine,
wherein the cooling unit is controlled depending on the magnetic flux or the temperature of the permanent magnet output from the magnet state estimating unit.

\* \* \* \* \*